United States Patent
Ishii et al.

(10) Patent No.: US 11,604,385 B2
(45) Date of Patent: Mar. 14, 2023

(54) LAMINATED GLASS AND PRODUCTION METHOD FOR LAMINATED GLASS

(71) Applicant: DAI NIPPON PRINTING CO., LTD., Tokyo (JP)

(72) Inventors: Norio Ishii, Tokyo (JP); Keisuke Miura, Tokyo (JP); Yusuke Hagiwara, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 209 days.

(21) Appl. No.: 16/635,204

(22) PCT Filed: Jul. 30, 2018

(86) PCT No.: PCT/JP2018/028475
§ 371 (c)(1),
(2) Date: Jan. 30, 2020

(87) PCT Pub. No.: WO2019/026849
PCT Pub. Date: Feb. 7, 2019

(65) Prior Publication Data
US 2021/0103174 A1    Apr. 8, 2021

(30) Foreign Application Priority Data
Jul. 31, 2017 (JP) .............................. JP2017-148594

(51) Int. Cl.
G02F 1/1339  (2006.01)
G02F 1/1333  (2006.01)
(Continued)

(52) U.S. Cl.
CPC .......... *G02F 1/13394* (2013.01); *B32B 3/085* (2013.01); *B32B 17/10005* (2021.01);
(Continued)

(58) Field of Classification Search
None
See application file for complete search history.

(56) References Cited

U.S. PATENT DOCUMENTS 4,418,102 A    11/1983  Ferrato
5,147,485 A *  9/1992  Gajewski .............. B32B 27/365
                                           156/286
(Continued)

FOREIGN PATENT DOCUMENTS

CN    1701265 A    11/2005
CN    105263706 A   1/2016
(Continued)

OTHER PUBLICATIONS

Apr. 6, 2021 Extended Search Report issued in European Patent Application No. 18840610.2.
(Continued)

*Primary Examiner* — Shan Liu
(74) *Attorney, Agent, or Firm* — Oliff PLC

(57) ABSTRACT

Provided are a laminated glass which has a reduced occurrence of voids and accumulation of liquid crystal, and a production method for the laminated glass. Also provided is a laminated glass which can prevent deterioration of a sealing material. This laminated glass 1 comprises a first glass plate 33A, a first intermediate film 31A, a liquid crystal film 10, a second intermediate film 31B, and a second glass plate, which are layered and disposed in this order, wherein the first glass plate 33A and the second glass plate 33B have a larger outer shape than that of the liquid crystal film 10, and a spacer 32 is provided in at least a portion of a region which is interposed between the first glass plate 33A and the second glass plate 33B and in which the liquid crystal film 10 is not disposed.

9 Claims, 24 Drawing Sheets

(51) Int. Cl.
  *B32B 17/10* (2006.01)
  *B32B 3/08* (2006.01)
  *G02F 1/1335* (2006.01)

(52) U.S. Cl.
  CPC .......... *B32B 17/10036* (2013.01); *B32B 17/10293* (2013.01); *B32B 17/10302* (2013.01); *B32B 17/10348* (2013.01); *B32B 17/10467* (2013.01); *B32B 17/10504* (2013.01); *B32B 17/10761* (2013.01); *B32B 17/10788* (2013.01); *G02F 1/133388* (2021.01); *G02F 1/133512* (2013.01)

(56) References Cited

U.S. PATENT DOCUMENTS

| | | | | |
|---|---|---|---|---|
| 6,654,083 | B1* | 11/2003 | Toda | G02F 1/133512 349/110 |
| 2005/0190332 | A1 | 9/2005 | Yano | |
| 2005/0227061 | A1 | 10/2005 | Slovak et al. | |
| 2009/0219468 | A1 | 9/2009 | Barton et al. | |
| 2009/0279004 | A1 | 11/2009 | Greenall et al. | |
| 2011/0171443 | A1 | 7/2011 | Thompson | |
| 2011/0292494 | A1* | 12/2011 | Danner | G02F 1/161 359/296 |
| 2013/0271714 | A1* | 10/2013 | Hirota | G02F 1/1339 349/139 |
| 2016/0075111 | A1 | 3/2016 | Dixon | |
| 2017/0163778 | A1* | 6/2017 | Noma | H04M 1/03 |
| 2018/0281352 | A1* | 10/2018 | Aoki | B32B 17/10779 |

FOREIGN PATENT DOCUMENTS

| | | | | |
|---|---|---|---|---|
| JP | H03-047392 | A | | 2/1991 |
| JP | H08-184273 | A | | 7/1996 |
| JP | 2007-326763 | A | | 12/2007 |
| JP | 2011-524546 | A | | 9/2011 |
| JP | 2016-164617 | A | | 9/2016 |
| JP | 2017223809 | A | * | 12/2017 |
| WO | 2010/032068 | A1 | | 3/2010 |
| WO | WO-2010032068 | A1 | * | 3/2010 ............. B32B 15/01 |
| WO | 2017/099167 | A1 | | 6/2017 |

OTHER PUBLICATIONS

Sep. 25, 2018 Search Report issued in International Patent Application No. PCT/JP2018/028475.
Dec. 1, 2021 Office Action issued in Chinese Patent Application No. 201880058438.1.
Jul. 27, 2022 Office Action issued in Chinese Patent Application No. 201880058438.1.
Hongjin Gau et al., "New Display Technology," Beijing: Beijing Publishing Co., Ltd. p. 122, Aug. 2014.
Jan. 19, 2023 Office Action issued in Chinese Patent Application No. CN201880058438.1.

* cited by examiner

FIG. 8

HEIGHT RELATIONSHIP BETWEEN SPACER AND LIQUID CRYSTAL FILM

| HEIGHT OF SPACER− HEIGHT OF LIQUID CRYSTAL FILM | BIASING OF LIQUID CRYSTAL | IN-CELL AIR BUBBLES | AFTER CELL/INTERLAYER ADHESION AC |
|---|---|---|---|
| −0.24mm | bad | good | excellent |
| 0.00mm | good | excellent | excellent |
| +0.12mm | excellent | excellent | excellent |
| +0.52mm | excellent | excellent | good |
| +0.90mm | excellent | excellent | good |
| +1.28mm | excellent | excellent | bad |

FIG. 9

INFLUENCE OF MATERIAL OF SPACER

| MATERIAL OF SPACER | BIASING OF LIQUID CRYSTAL | IN-CELL AIR BUBBLES | AFTER CELL/INTERLAYER ADHESION AC |
|---|---|---|---|
| PVB (SAME INTERLAYER) | excellent | excellent | excellent |
| EVA (DIFFERENT INTERLAYER) | excellent | excellent | excellent |
| PET BASE MATERIAL | excellent | excellent | good |
| COP BASE MATERIAL | excellent | excellent | good |

※ HEIGHT DIFFERENCE BETWEEN LIQUID CRYSTAL FILM AND SPACER: +0.12mm

FIG. 10A

ASPECT OF SPACER (PVB INTERLAYER)

| | ASPECT OF SPACER | BIASING OF LIQUID CRYSTAL | IN-CELL AIR BUBBLES | AFTER CELL/INTERLAYER ADHESION AC |
|---|---|---|---|---|
| ASPECT1-1 | FRAME-SHAPE | excellent | excellent | excellent |
| ASPECT1-2 | FOUR LINES | excellent | excellent | excellent |
| ASPECT1-3 | TWO LINES | good | excellent | excellent |
| ASPECT1-4 | ONE LINE | bad | bad | excellent |
| ASPECT1-5 | TWO PIECES HAVING L-SHAPE | excellent | excellent | good |
| ASPECT1-6 | ONE PIECE HAVING L-SHAPE | bad | good | excellent |
| ASPECT1-7 | GATE SHAPE | excellent | excellent | good |

FIG. 10B

ASPECT OF SPACER (PET BASE MATERIAL)

| | ASPECT OF SPACER | BIASING OF LIQUID CRYSTAL | IN-CELL AIR BUBBLES | AFTER CELL/INTERLAYER ADHESION AC |
|---|---|---|---|---|
| ASPECT1-1 | FRAME-SHAPE | good | excellent | good |
| ASPECT1-2 | FOUR LINES | good | excellent | good |
| ASPECT1-3 | TWO LINES | good | excellent | excellent |
| ASPECT1-4 | ONE LINE | bad | bad | excellent |
| ASPECT1-5 | TWO PIECES HAVING L-SHAPE | good | excellent | good |
| ASPECT1-6 | ONE PIECE HAVING L-SHAPE | bad | bad | good |
| ASPECT1-7 | GATE SHAPE | excellent | excellent | excellent |

FIG. 18

INFLUENCE OF OCCUPANCY RATE OF SPACER

| | SPACER PVB | CELL SHAPE | OCCUPANCY RATE | INTERLAYER AIR BUBBLES | BIASING OF LIQUID CRYSTAL | IN-CELL AIR BUBBLES | REMARKS |
|---|---|---|---|---|---|---|---|
| ASPECT2-1 | SPACER ABSENT | SQUARE SHAPE | 99% | excellent | bad | bad | DUE TO WORKING PROCESS |
| ASPECT2-2 | SPACER PRESENT GAP:0mm | SQUARE SHAPE | 100% | excellent | excellent | excellent | OVERLAPPING: ABSENT |
| ASPECT2-3 | SPACER PRESENT GAP:0mm | SQUARE SHAPE | 100% | bad | bad | bad | OVERLAPPING: PRESENT INTERLAYER ON CELL |
| ASPECT2-4 | SPACER PRESENT GAP:0mm | SQUARE SHAPE | 100% | bad | bad | bad | OVERLAPPING: PRESENT INTERLAYER UNDER CELL |
| ASPECT2-5 | SPACER PRESENT GAP:1mm | SQUARE SHAPE | 91% | excellent | excellent | excellent | OVERLAPPING: ABSENT |
| ASPECT2-6 | SPACER PRESENT GAP:1mm | SQUARE SHAPE ANGLE R=20 | 85% | bad | bad | bad | OVERLAPPING: ABSENT |
| ASPECT2-7 | SPACER PRESENT GAP:1mm | CIRCULAR SHAPE R=40 | 69% | bad | bad | bad | OVERLAPPING: ABSENT |

LAMINATED GLASS AND PRODUCTION METHOD FOR LAMINATED GLASS

TECHNICAL FIELD

The present invention relates to laminated glass, and a production method for laminated glass.

BACKGROUND ART

In the related art, there are suggested light control members capable of being used in an electronic blind that is adhered to, for example, a window and controls transmission of external light (Patent Document 1, Patent Document 2). One of the light control members uses liquid crystal. With regard to a liquid crystal film as the light control member that uses liquid crystal, a liquid crystal material is sandwiched by transparent plate materials including a transparent electrode to produce a liquid crystal cell, and the liquid crystal cell is sandwiched by linear polarization plates to produce the liquid crystal film. The liquid crystal film causes an electric field applied between transparent electrodes to vary so as to cause an alignment of liquid crystal to vary, thereby controlling a transmission amount of the external light.

In addition, it has been proposed to produce laminated glass by further sandwiching the liquid crystal film with glass (Patent Document 3). However, in the related art, laminated glass sandwiching the liquid crystal film is not actually produced. Accordingly, laminated glass sandwiching the liquid crystal film may not be correctly produced in the case of simply applying the same method as in the interlayer interposed laminated glass of the related art. As a case where the laminated glass sandwiching the liquid crystal film cannot be correctly produced, there is a phenomenon (hereinafter, referred to as "accumulation of liquid crystal") in which a large amount of liquid crystal is partially accumulated in the liquid crystal film. In addition, voids may occur at a part of the laminated glass in some cases. When the accumulation of liquid crystal or voids exist, the laminated glass is discarded as a defective product, and thus an improvement is desired.

In addition, the liquid crystal film has a configuration in which the liquid crystal layer is sealed by a sealing material, but there is a concern that the sealing material is irradiated with solar light depending on a use environment and the sealing material may deteriorate. When the sealing material deteriorates, there is a concern that liquid crystal in the liquid crystal layer may be leaked, and thus a countermeasure thereof is desired.

Patent Document 1: Japanese Unexamined Patent Application, Publication No. H03-47392

Patent Document 2: Japanese Unexamined Patent Application, Publication No. H08-184273

Patent Document 3: Japanese Unexamined Patent Application, Publication No. 2016-164617

DISCLOSURE OF THE INVENTION

Problems to be Solved by the Invention

An object of the invention is to provide laminated glass and a method for producing the laminated glass which are capable of reducing accumulation of liquid crystal or occurrence of voids. In addition, another object of the invention is to provide laminated glass capable of preventing deterioration of a sealing material.

Means for Solving the Problems

The invention accomplishes the above-described objects by the following solving means. Note that, description will be made by giving a reference numeral corresponding to the embodiments of the invention for easy understanding, but there is no limitation thereto.

According to a first aspect of the invention, there is provided laminated glass (1) including: a first glass plate (33A); a first interlayer (31A); a liquid crystal film (10); a second interlayer (31B); and a second glass plate (33B), each being layered and disposed in this order. The liquid crystal film (10) includes a liquid crystal layer (14) and a sealing material (25) that is disposed to seal the liquid crystal layer (14) and surrounds the periphery of the liquid crystal layer (14), the first glass plate (33A) and the second glass plate (33B) have an outer shape larger than an outer shape of the liquid crystal film (10), a spacer (32) is disposed in at least a part of a region which is interposed between the first glass plate (33A) and the second glass plate (33B) and in which the liquid crystal film (10) is not disposed, and an outer side of the sealing material (25) is surrounded by the spacer (32) in a plan view.

According to a second aspect of the invention, in the laminated glass (1) according to the first aspect, the spacer (32) may be disposed to surround the entirety of an outer periphery of the liquid crystal film (10).

According to a third aspect of the invention, in the laminated glass (1) according to the first aspect, a height of the spacer (32) may be equal to or higher than a height of the liquid crystal film (10).

According to a fourth aspect of the invention, in the laminated glass (1) according to the first aspect, the spacer (32) may be disposed adjacent to the liquid crystal film (10).

According to a fifth aspect of the invention, in the laminated glass (1) according to the first aspect, the spacer (32) may be disposed with a distance from the liquid crystal film (10).

According to a sixth aspect of the invention, in the laminated glass (1) according to the fifth aspect, at least one of the first interlayer (31A) and the second interlayer (31B) may be disposed to partially enter a portion between the spacer (32) and the liquid crystal film (10).

According to a seventh aspect of the invention, there is provided a method for producing laminated glass (1) by using a laminated body (30) in which a liquid crystal film (10) is interposed between a first glass plate (33A) and a second glass plate (33B), the liquid crystal film (10) including a liquid crystal layer (14) and a sealing material (25) that is disposed to seal the liquid crystal layer (14) and surrounds the periphery of the liquid crystal layer (14), and the first glass plate (33A) and the second glass plate (33B) having an outer shape larger than an outer shape of the liquid crystal film (10). The method includes: a spacer disposing process of disposing a spacer (32) in at least a part of a region which is interposed between the first glass plate (33A) and the second glass plate (33B) and in which the liquid crystal film (10) is not disposed so as to surround an outer side of the sealing material (25) in a plan view; and a pressurization process of pressurizing a plate surface of at least one of the first glass plate (33A) and the second glass plate (33B) in a state in which the spacer (32) is disposed.

According to an eighth aspect of the invention, in the method for producing laminated glass (1) according to the seventh aspect, a height of the spacer (32) may be equal to or higher than a height of the liquid crystal film (10).

According to a ninth aspect of the invention, there is provided laminated glass (1A, 1B, 1C, or 1D) including: a first glass plate (33A); a first interlayer (31A); a liquid crystal film (10); a second interlayer (31B); and a second glass plate (33B), each being layered and disposed in this order. The liquid crystal film (10) includes a sealing material (25) that seals liquid crystal at the periphery, and a light-shielding part (70A, 70B, 70C, or 70D) that shields light that reaches the sealing material (25) from the outside is provided along the outer periphery of the laminated glass (1A, 1B, 1C, or 1D).

According to a tenth aspect of the invention, in the laminated glass (1A) according to the ninth aspect, in a use state, the light-shielding part (70A) may be disposed from an end surface of the laminated glass (1A) up to a position on an inner side in comparison to the sealing material (25), and may be disposed at a position between the liquid crystal film (10) and the first glass plate (33A).

According to an eleventh aspect of the invention, in the laminated glass (1B) according to the ninth aspect, the light-shielding part (70A or 70B) may be disposed from an end surface of the laminated glass (1B) up to a position on an inner side in comparison to the sealing material (25), and may be disposed at both a position between the liquid crystal film (10) and the first glass plate (33A), and a position between the liquid crystal film (10) and the second glass plate (33B).

According to a twelfth aspect of the invention, in the laminated glass (1C) according to the ninth aspect, the light-shielding part (70C) may be disposed to cover an end surface of the laminated glass (1C), and to sandwich the laminated glass (1C) from the end surface up to a position on an inner side in comparison to the sealing material (25).

According to a thirteenth aspect of the invention, in the laminated glass (1D) according to the ninth aspect, the light-shielding part (70A, 70B, or 70D) may be disposed to cover an end surface of the laminated glass (1D), and to sandwich the laminated glass (1D) from the end surface up to a position on an outer side in comparison to the sealing material (25), and may be disposed at both a position between the liquid crystal film (10) and the first glass plate (33A), and a position between the liquid crystal film (10) and the second glass plate (33B).

According to a fourteenth aspect of the invention, in the laminated glass (1A, 1B, 1C, or 1D) according to the ninth aspect, the first glass plate (33A) and the second glass plate (33B) may have an outer shape larger than an outer shape of the liquid crystal film (10), and a spacer (32) may be disposed in at least a part of a region which is interposed between the first glass plate (33A) and the second glass plate (33B) and in which the liquid crystal film (10) is not disposed.

Effects of the Invention

According to the invention, it is possible to provide laminated glass and a method for producing the laminated glass which are capable of reducing accumulation of liquid crystal or occurrence of voids. In addition, according to the invention, it is possible to provide laminated glass capable of preventing deterioration of a sealing material.

BRIEF DESCRIPTION OF THE DRAWINGS

FIG. 8 is a view summarizing experiment results obtained by examining an influence applied to a prelamination result by a height relationship between a spacer 32 and the liquid crystal film 10.

FIG. 9 is a view summarizing experiment results obtained by examining an influence applied to the prelamination result by a material of the spacer 32.

FIG. 10A is a view summarizing experiment results obtained by examining an influence applied to the prelamination result by a shape and an arrangement of the spacer 32 formed by a PVB interlayer.

FIG. 10B is a view summarizing experiment results obtained by examining an influence applied to the prelamination result by the shape and the arrangement of the spacer 32 formed by a PET base material.

FIG. 18 is a view summarizing experiment results obtained by examining an influence applied to the prelamination result by occupancy rate of the spacer 32.

PREFERRED MODE FOR CARRYING OUT THE INVENTION

Hereinafter, preferred embodiments for carrying out the invention will be described with reference to the accompanying drawings and the like.

First Embodiment

Figure 1:
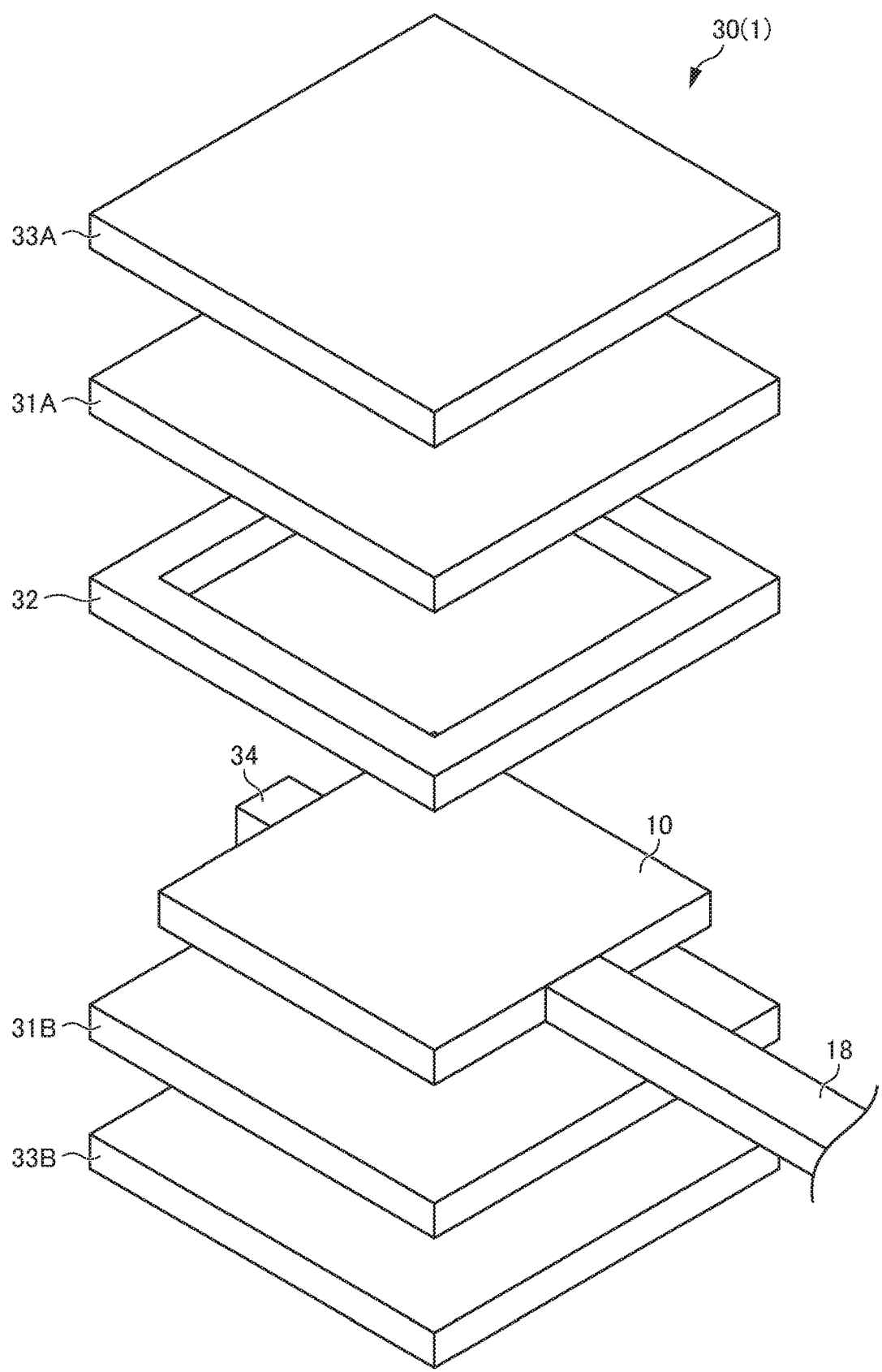
FIG. 1 is an exploded perspective view illustrating a configuration of a laminated body 30 of an embodiment.

FIG. 1 is an exploded perspective view illustrating a configuration of a laminated body 30 of this embodiment.

Note that, the following respective drawings including FIG. 1 are schematic views, and sizes and shapes of respective portions are appropriately exaggerated for easy understanding. In addition, in the following description, specific numerical values, shapes, materials, and the like are described for explanation, but these may be appropriately changed. In this specification, it is assumed that terms which specify shapes and geometric conditions, for example, terms such as parallel and orthogonal also include a state having a similar optical function and having an error that can be regarded as parallel and orthogonal in addition to strict meaning. In this specification, words such as a plate, a sheet, and a film are used, but these words are generally used, and the plate, the sheet, and the film are used in the order of larger thickness, and in this specification, the words are used in accordance with the order of thickness. However, since such use does not have technical meaning, and the words may be appropriately substituted with each other. In this specification, it is assumed that a sheet surface in each sheet represents a surface in a plane direction of the sheet when viewed as a whole. Note that, this is also true of a plate surface and a film surface. In addition, in the invention, "transparent" represents that at least wavelength light that is used is transmitted. For example, even in a member through which visible light is not transmitted, if infrared rays are transmitted through the member and the member is used for infrared rays, it is assumed that the member is treated to be transparent. Note that, specific numerical values defined in this specification and appended claims should be treated to include a typical error range. That is, it should be understood that a difference by approximately ±10% is substantially the same, and numerical values set to a range that slightly exceeds a numerical value range of this specification should be interpreted to be substantially within the range of this specification.

In description of this embodiment, a body in which respective constituent members of the laminated glass 1 are layered and disposed is referred to as a laminated body 30. The laminated body 30 represents a state before the respective members of the laminated glass 1 are jointed to each other, and thus a configuration of the laminated body 30 is the same as that of the laminated glass 1. Accordingly, the exploded perspective view in FIG. 1 also represents an exploded perspective view of the laminated glass 1. In the laminated body 30 of this embodiment, a first glass plate 33A, a first interlayer forming sheet 31A, a liquid crystal film 10, a second interlayer forming sheet 31B, and a second glass plate 33B are layered and disposed in this order. In addition, a spacer 32 and an inclination mitigation member 34 are arranged at positions on the same plane as in the liquid crystal film 10.

Figure 2:
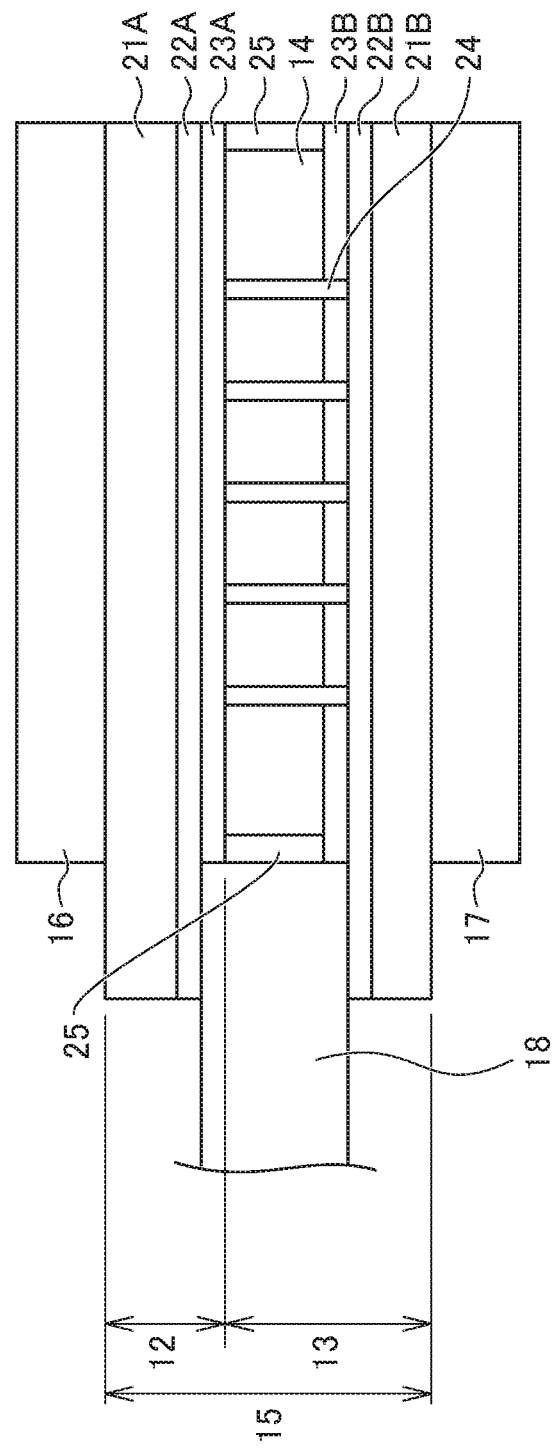
FIG. 2 is a cross-sectional view illustrating a liquid crystal film 10 of the embodiment.

FIG. 2 is a cross-sectional view illustrating the liquid crystal film 10 of the embodiment. The liquid crystal film 10 is constituted as laminated glass and is used at a portion for realizing light control. Examples of the portion for realizing light control include a portion (a rear window, a side window, a sunroof, and the like) of a vehicle to which external light is incident, window glass of a building, a showcase, an indoor transparent partition, and the like.

The liquid crystal film 10 is a light control member that controls transmitting light by using liquid crystal and is produced as follows. Specifically, a liquid crystal layer 14 is sandwiched by a film-shaped first laminated body 12 for liquid crystal and a film-shaped second laminated body 13 for liquid crystal to produce a liquid crystal cell 15, and the liquid crystal cell 15 is sandwiched by linear polarization plates 16 and 17 to produce the liquid crystal film 10. In this embodiment, vertical alignment (VA) type is employed for driving the liquid crystal layer 14. However, there is no limitation to the type, and various driving types such as twisted nematic (TN) type and an in-plane-switching (IPS) type can be applied. Note that, the VA type is a type of controlling transmitting light by causing an alignment of liquid crystal to vary between a vertical alignment and a horizontal alignment. In the absence of an electric field, the liquid crystal is vertically oriented, and thus the liquid crystal layer 14 is sandwiched by a vertical alignment layer to construct the liquid crystal cell 15, and a liquid crystal material is horizontally oriented by application of the electric field.

In the liquid crystal film 10, an in-liquid-crystal spacer 24 for constantly maintaining the thickness of the liquid crystal layer 14 is provided in the first laminated body 12 for liquid crystal and the second laminated body 13 for liquid crystal. The first laminated body 12 for liquid crystal and the second laminated body 13 for liquid crystal are formed by sequentially forming a first electrode 22A and a second electrode 22B, and alignment layers 23A and 23B on base materials 21A and 21B, respectively. In addition, the liquid crystal film 10 may be set to a configuration provided with a guest-host type liquid crystal cell, and in this case, a linear polarization plate may be omitted. In addition, in the case of the guest-host type, the linear polarization plate may be disposed on one side or both sides of the liquid crystal cell as necessary.

The liquid crystal film 10 is configured to control transmission of external light by causing a potential difference between the first electrode 22A and the second electrode 22B to vary, and to switch a state between a transmission state and a non-transparent state. In this embodiment, with regard to driving of the liquid crystal layer 14, description will be given of an example in which the liquid crystal layer 14 is driven by using a so-called normally black configuration. However, there is no limitation to the driving, and the liquid crystal layer 14 may be driven with a normally white configuration. In addition, in the case of employing the IPS type, the first electrode 22A and the second electrode 22B are collectively configured on the alignment layer 23A side or the alignment layer 23B side, and the first laminated body 12 for liquid crystal and the second laminated body 13 for liquid crystal are configured to correspond to the configuration. Note that, the normally black has a structure in which a transmittance becomes minimum when a voltage is not applied to liquid crystal, and a black screen is obtained. The normally white has a structure in which a transmittance becomes maximum when a voltage is not applied to liquid crystal, and transparency is obtained.

[Base Material]

As the base materials 21A and 21B, various transparent film materials such as TAC, polycarbonate, COP, acryl, and PET which have flexibility and which are applicable to the liquid crystal cell 15 are applicable, and in this embodiment, a polycarbonate film material in which a hard coat layer is formed on both surfaces is applied.

[Electrode]

As the first electrode 22A and the second electrode 22B, various configurations which can apply an electric field to the liquid crystal layer 14, and are recognized to be transparent is applicable. In this embodiment, the first electrode 22A and the second electrode 22B is formed by producing a transparent conductive layer with an indium tin oxide (ITO) that is a transparent electrode material on entire surfaces of the base materials 21A and 21B. As described above, in the IPS type or the like, electrodes have a configuration patterned to a desired shape.

[Alignment Layer]

The alignment layer 23A and the alignment layer 23B are formed by an optical alignment layer. As an optical alignment material applicable to the optical alignment layer, various materials to which an optical alignment method is applicable may be widely applicable, but in this embodiment, for example, a photo-dimerization type material is used. The photo-dimerization type material is disclosed in "M. Schadt, K. Schmitt, V. Kozinkov and V. Chigrinov: Jpn. J. Appl. Phys., 31, 2155 (1992)", "M. Schadt, H. Seiberle and A. Schuster: Nature, 381, 212 (1996)", and the like.

The alignment layer 23A and the alignment layer 23B may be produced by rubbing processing instead of the optical alignment layer. In this case, the alignment layers 23A and 23B are formed by producing various material layers such as polyimide applicable to the alignment layers and then by producing fine line-shaped irregularities by performing rubbing processing on a surface of the material layer with a rubbing roll. In addition, with regard to the alignment layer 23A and the alignment layer 23B, instead of the alignment layer by the rubbing processing, and the optical alignment layer, the fine line-shaped irregularities produced by rubbing processing may be produced by shaping processing to produce the alignment layer.

[In-Liquid-Crystal Spacer]

The in-liquid-crystal spacer 24 is provided to define the thickness of the liquid crystal layer 14, and various resin materials are widely applicable, but in this embodiment, the in-liquid-crystal spacer 24 is produced by a photoresist. The in-liquid-crystal spacer 24 is formed by coating a photoresist over the base material 21B on which the second electrode 22B is formed, and by exposing and developing the photoresist. Note that, the in-liquid-crystal spacer 24 may be provided in the first laminated body 12 for liquid crystal, or may be provided on both the first laminated body 12 for liquid crystal and the second laminated body 13 for liquid crystal. In addition, the in-liquid-crystal spacer 24 may be provided on the alignment layer 23B. In addition, as the spacer, a so-called bead spacer may be applied. With regard to the bead spacer, not only a spherical shape but also a rod shape (cylindrical shape) or an elliptical shape may be used. In the case of using the bead spacer as the in-liquid-crystal spacer 24, after the alignment layer is formed, the bead spacer is scattered onto the alignment layer to be disposed thereon. In this case, from the viewpoint of suppressing movement of the bead spacer in the liquid crystal layer 14 (on the alignment layer), a fixing layer formed with an adhesive or the like may be provided on the surface of the bead spacer. In addition, from the viewpoint of suppressing movement of the bead spacer in the liquid crystal layer 14, the bead spacer may be dispersed in advance in a resin that forms the alignment layer to dispose the bead spacer in combination with forming of the alignment layer, or the bead spacer may be dispersed in advance in a liquid crystal material that constitutes the liquid crystal layer to dispose the bead spacer in combination with forming of the liquid crystal layer. Note that, as in the spacer of the photoresist as described above, the bead spacer may be disposed in any one of the first laminated body and the second laminated body, or may be disposed in each of the laminated bodies.

[Liquid Crystal Layer]

As the liquid crystal layer 14, various liquid crystal materials applicable to this kind of light control member can be widely applied. Specifically, a nematic liquid crystal compound, a smectic liquid crystal compound, and a cholesteric liquid crystal compound can be applied to the liquid crystal layer 14 as a liquid crystal compound having no polymerizable functional group. Examples of the nematic liquid crystal compound include a biphenyl compound, a terphenyl compound, phenylcyclohexyl compound, a biphenylcyclohexyl compound, a phenylbicyclohexyl compound, a trifluoro compound, a phenyl benzoate compound, a cyclohexyl benzoate phenyl compound, a phenyl phenyl benzoate compound, a bicyclohexylcarboxylate phenyl compound, an azomethine compound, an azo compound, an azooxy compound, a stilbene compound, a tolan compound, an ester compound, a bicyclohexyl compound, a phenylpyrimidine compound, a biphenylpyrimidine compound, a pyrimidine compound, a biphenylethyne compound, and the like. Examples of the smectic liquid crystal compound include ferroelectric polymer liquid crystal compounds such as a polyacrylate compound, a polymethacrylate compound, a polychloroacrylate compound, a polyoxirane compound, a polysiloxanes compound, and a polyester compound. Examples of the cholesteric liquid crystal compound include cholesteryl linoleate, cholesteryl oleate, cellulose, cellulose derivatives, polypeptide, and the like. In addition, as commercially available products, for example, a liquid crystal material such as MLC2166 manufactured by MERCK can be applied. Note that, in the case of the guest-host type, although a liquid crystal material and a dye for light control are mixed in the liquid crystal layer 14, a mixture of the liquid crystal material and the dye suggested for the guest-host method can be widely applied. In the liquid crystal cell 15, a sealing material 25 is disposed to surround the liquid crystal layer 14, and the leakage of liquid crystal is prevented by the sealing material 25. For example, as illustrated in FIG. 1, in a case where the liquid crystal film 10 has a square shape, and the liquid crystal layer 14 also has a quadrangular shape, the sealing material 25 is disposed in a frame shape on an outer side of the liquid crystal layer 14. Here, as the sealing material 25, for example, an epoxy resin, an ultraviolet curable resin, and the like can be applied.

[Flexible Printed Wiring Substrate]

A flexible printed wiring substrate 18 is disposed to perform electric connection between the first electrode 22A and the second electrode 22B and the outside. For example, as illustrated in FIG. 2, the flexible printed wiring substrate 18 is disposed to be interposed between the first electrode 22A and the second electrode 22B in a region in which the first electrode 22A and the second electrode 22B do not sandwich the liquid crystal layer 14. According to this, the connection is established. Note that, the flexible printed wiring substrate 18 is not limited to the shape illustrated in FIG. 2, and may be set to an aspect of not being interposed between the first electrode 22A and the second electrode 22B, or may be set to an aspect of being connected to only one of the first electrode 22A and the second electrode 22B as an example.

Returning to FIG. 1, the first glass plate 33A and the second glass plate 33B are plate glass that is disposed on front and rear surfaces of the laminated glass 1, respectively. In this embodiment, as the first glass plate 33A and the second glass plate 33B, plate glass having the thickness of 2 mm is used. Note that, in the following description, the first glass plate 33A and the second glass plate 33B will be described as flat plate glass, but may be curved glass or a glass plate having a 3D curved surface. In addition, the first glass plate 33A and the second glass plate 33B have an outer shape larger than that of the liquid crystal film 10.

In this embodiment, as the first interlayer forming sheet 31A and the second interlayer forming sheet 31B, a sheet that is formed from a polyvinyl butyral (PVB) resin and has the thickness of 760 μm is used. The first interlayer forming sheet 31A joins the first glass plate 33A and the liquid crystal film 10, and similarly, the second interlayer forming sheet 31B joins the second glass plate 33B and the liquid crystal film 10. In a state in which the laminated glass 1 is completed, the first interlayer forming sheet 31A and the second interlayer forming sheet 31B constitute a first interlayer and a second interlayer, respectively. Accordingly, in a state in which the laminated glass 1 is completed, the first interlayer forming sheet 31A and the second interlayer forming sheet 31B may be referred to as a first interlayer 31A and a second interlayer 31B, respectively. Note that, as a material of the first interlayer forming sheet 31A and the second interlayer forming sheet 31B, ethylene/vinyl acetate copolymer (EVA), polyethylene terephthalate (PET), cycloolefin polymer (COP), or the like may be used.

The spacer 32 is disposed in at least a part of a region which is interposed between the first glass plate 33A and the second glass plate 33B, and in which the liquid crystal film 10 is not disposed. Accordingly, the spacer 32 is disposed at a position on the same plane as in the liquid crystal film 10, and can fill a void where the liquid crystal film 10 is not disposed. It is preferable that the spacer 32 has a thickness larger than that of the liquid crystal film 10. In addition, when the spacer 32 is constituted by using the same material as that of the first interlayer forming sheet 31A and the second interlayer forming sheet 31B, it is possible to enhance joining strength between the first interlayer forming sheet 31A and the second interlayer forming sheet 31B. In the aspect illustrated in FIG. 1, the spacer 32 is formed in a hollow quadrangular shape, an outer shape thereof is the same as that of the first glass plate 33A and the second glass plate 33B, and an inner hollow shape is set to the same as that of the outer shape of the liquid crystal film 10. Accordingly, the spacer 32 is disposed to completely fill a void in which the liquid crystal film 10 is not disposed. Details of a dimensional relationship between the spacer 32 and the liquid crystal film 10, the material of the spacer 32, and the shape and disposition of the spacer 32 will be described later.

The inclination mitigation member 34 is a member that mitigates a relative inclination of the first glass plate 33A and the second glass plate 33B in the laminated body 30 which occurs due to the thickness of the flexible printed wiring substrate 18. For example, as illustrated in FIG. 1, the inclination mitigation member 34 is disposed at a position opposite to the flexible printed wiring substrate 18 with the liquid crystal film 10 interposed therebetween. The disposition position of the inclination mitigation member 34 is illustrative only, and the inclination mitigation member 34 may be disposed at an optimal position in correspondence with the size or shape of the laminated glass 1. In addition, it is preferable that the thickness of the inclination mitigation member 34 is the same as that of the flexible printed wiring substrate 18. In addition, it is preferable that the inclination mitigation member 34 is constituted by a material that is the same as or similar to the material of the flexible printed wiring substrate 18.

Figure 3:
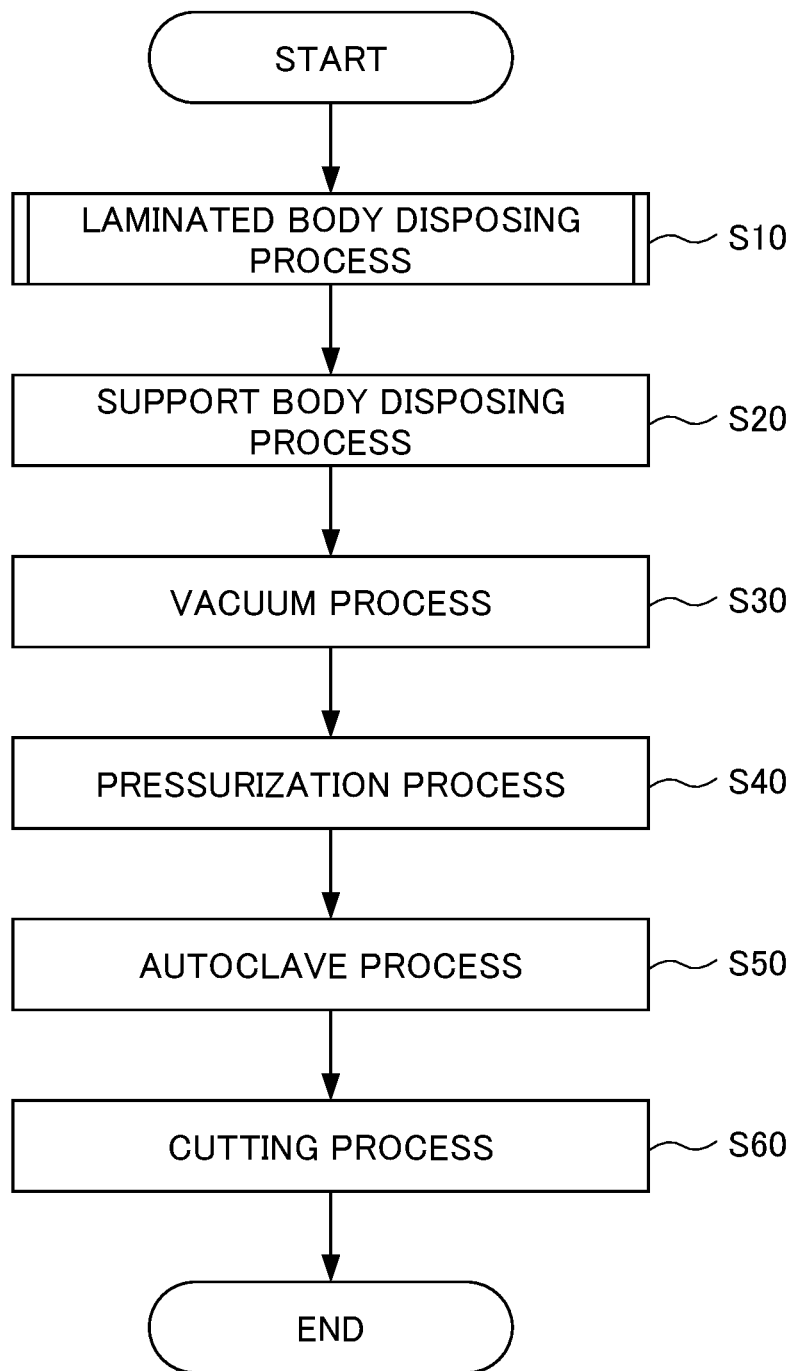
FIG. 3 is a flowchart illustrating a method for producing laminated glass 1.
Figure 4:
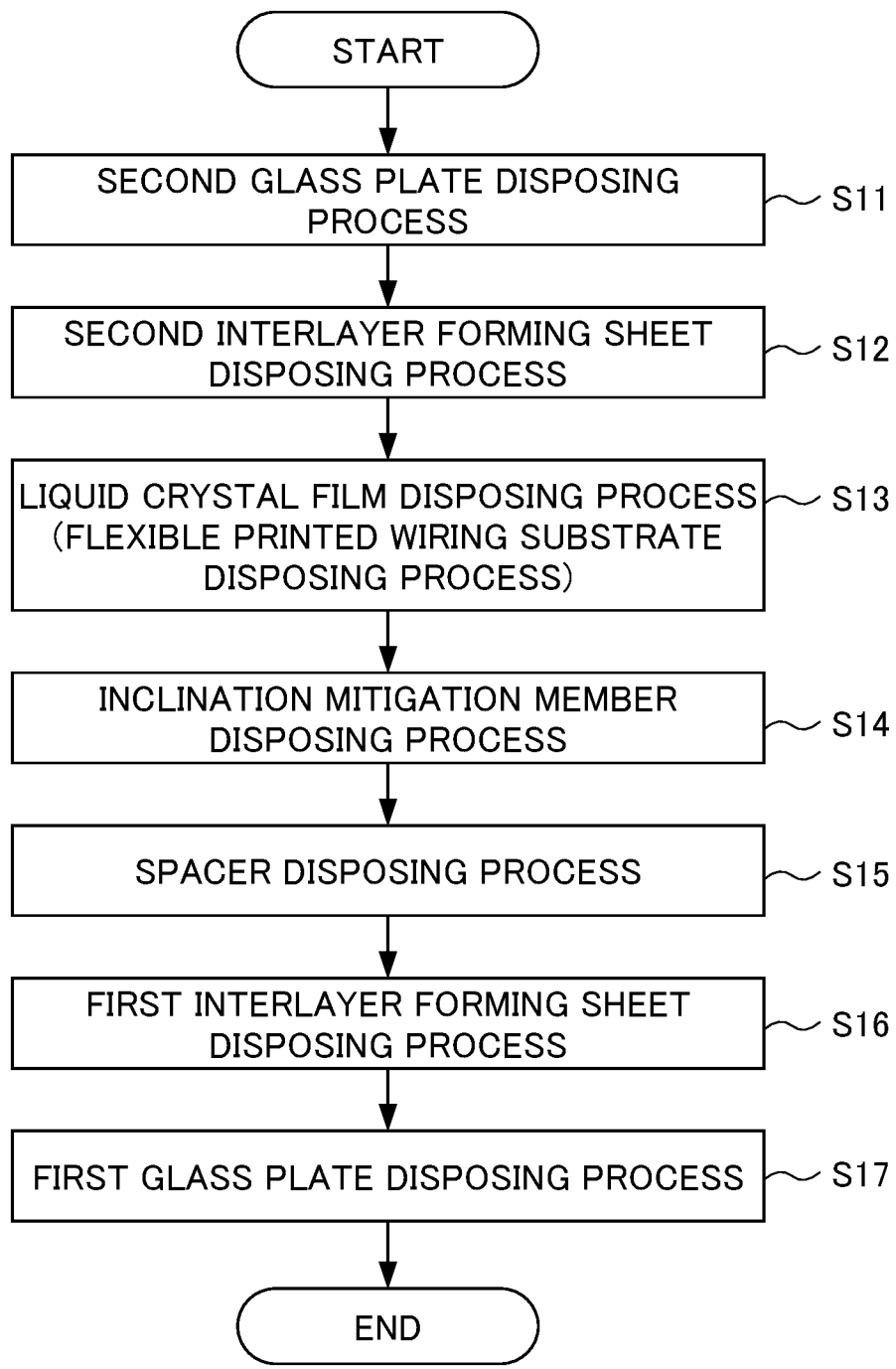
FIG. 4 is a flowchart illustrating a laminated body disposing process in FIG. 3 in more detail.

Next, a method for producing the laminated glass 1 will be described. FIG. 3 is a flowchart illustrating the method for producing the laminated glass 1. FIG. 4 is a flowchart illustrating a laminated body disposing process in FIG. 3 in more detail. Production of the laminated glass 1 is initiated from execution of the laminated body disposing process in step (hereinafter, simply described as "S") 10. The laminated body disposing process will be described with reference to FIG. 4.

In S11, the second glass plate 33B is disposed (second glass plate disposing process). Note that, in a case using a second backing plate 41B to be described later, after disposing the second backing plate 41B, the second glass plate 33B is disposed.

In S12, the second interlayer forming sheet 31B is disposed on the second glass plate 33B (second interlayer forming sheet disposing process).

In S13, the liquid crystal film 10 is disposed on the second interlayer forming sheet 31B (liquid crystal film disposing process). Here, in this embodiment, since the flexible printed wiring substrate 18 is already connected to the liquid crystal film 10, the flexible printed wiring substrate 18 is also disposed in S13 (flexible printed wiring substrate disposing process).

In S14, the inclination mitigation member 34 is disposed at the above-described predetermined position (inclination mitigation member disposing process).

In S15, the spacer 32 is disposed at a position on the second interlayer forming sheet 31B and at which the liquid crystal film 10 is not disposed. Note that, the spacer 32 overlaps the flexible printed wiring substrate 18 and the inclination mitigation member 34, but the spacer 32 is deformed due to the subsequent pressurization process or the like, and thus the overlapping has no problem in this embodiment.

In S16, the first interlayer forming sheet 31A is disposed on the liquid crystal film 10 and the spacer 32 (first interlayer forming sheet disposing process).

In S17, the first glass plate 33A is disposed on the first interlayer forming sheet 31A (first glass plate disposing process). Through the above-described processes, disposition (temporary lamination) of the laminated body 30 is completed.

Figure 5:
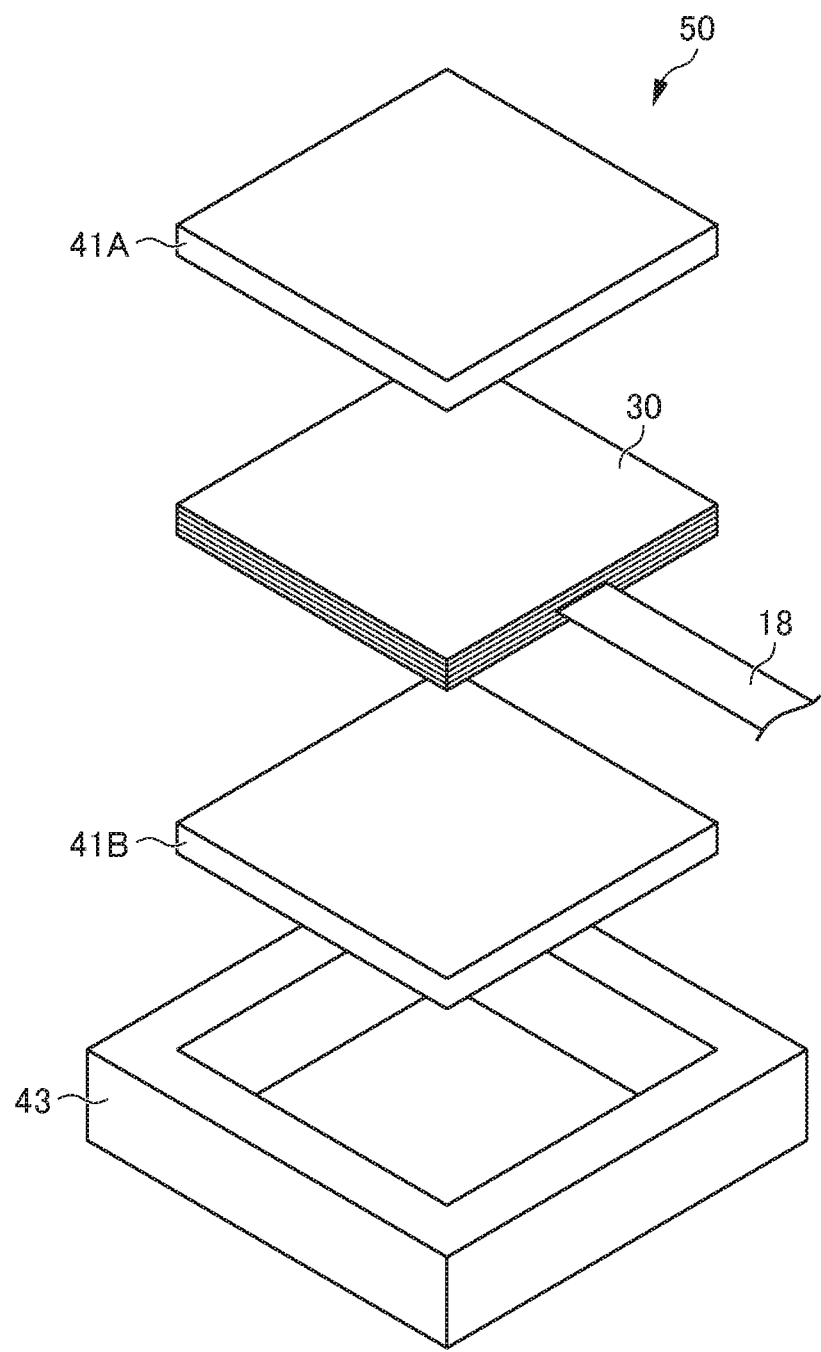
FIG. 5 is a view illustrating a laminated body support structure 50 that is configured in a process of producing the laminated glass 1.

FIG. 5 is a view illustrating a laminated body support structure 50 that is configured in the process of producing the laminated glass 1. Respective constituent members of the laminated body 30 are not fixed to each other, and thus in this state, there is a concern that position deviation may occur in the producing process. In addition, since the laminated glass 1 of this embodiment has a configuration in which the liquid crystal film 10 is sandwiched, it is necessary to uniformly apply a pressure to the first glass plate 33A and the second glass plate 33B in the subsequent pressurization process. Here, in this embodiment, the laminated body support structure 50 capable of stably holding the laminated body 30 in the process of producing the laminated body 30 is constituted.

The laminated body support structure 50 of this embodiment includes the laminated body 30, a first backing plate 41A, a second backing plate 41B, and a support body 43.

The first backing plate 41A and the second backing plate 41B are members disposed to sandwich the laminated body 30 from upper and lower sides. As the first backing plate 41A and the second backing plate 41B of this embodiment, glass having a thickness that is the same as or equal to or greater than the thickness of the first glass plate 33A and the second glass plate 33B. A main purpose of the first backing plate 41A and the second backing plate 41B is to prevent the first glass plate 33A and the second glass plate 33B from being bent at the time of pressurization by using glass having a thickness larger than the thickness of the first glass plate 33A and the second glass plate 33B. Accordingly, the first backing plate 41A and the second backing plate 41B are not limited to glass, and may be constituted by another member. Note that, in a case where the rigidity of the first glass plate 33A and the second glass plate 33B is sufficiently high, the first backing plate 41A and the second backing plate 41B may be omitted.

The support body 43 is a frame-shaped member that is disposed along the outer periphery of the laminated body 30. The support body 43 is constituted by a material having rigidity higher than that of the first interlayer forming sheet 31A and the second interlayer forming sheet 31B in the pressurization process to be described later. In this embodiment, a square bar made of aluminum is used. In addition, it is necessary for a height of the support body 43 to be within an appropriate range with respect to an overlapping height of the laminated body 30, the first backing plate 41A, and the second backing plate 41B (a height difference is within a predetermined value). Note that, in the case of producing the laminated glass without using the first backing plate 41A and the second backing plate 41B, it is necessary for the height of the support body 43 to be within an appropriate range in comparison with the height of the laminated body 30.

Note that, as the support body 43, a member constituted in a frame shape is illustrated as an example, but there is no limitation to the example. As a configuration capable of being partially disassembled, the support body 43 may be set to a configuration in which attachment and detachment at the periphery of the laminated body 30 is easy.

Returning to FIG. 3, in S20, the support body 43 is disposed at the periphery of the laminated body 30 (support body disposing process).

Figure 6:
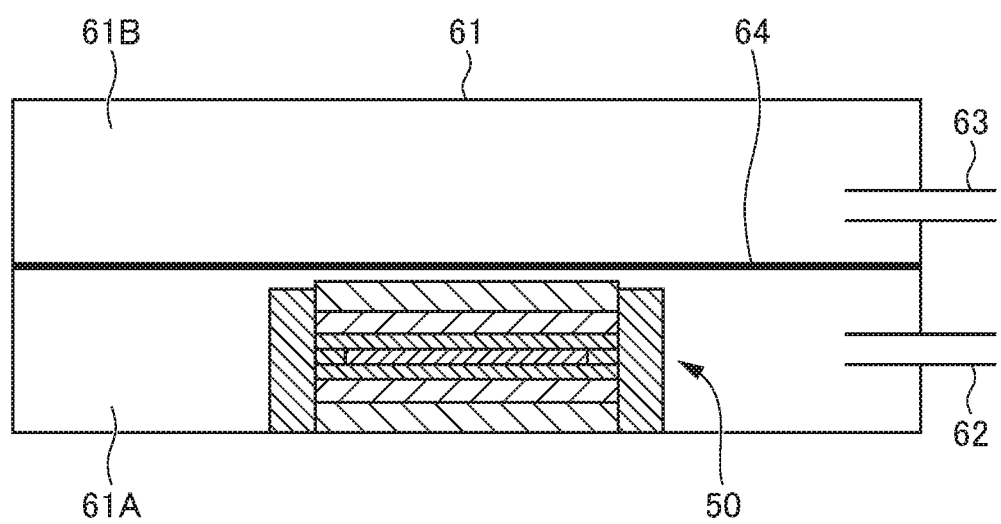
FIG. 6 is a view illustrating an outline of prelamination processing by a vacuum laminator.

In S30, a vacuum process of setting the inside of the laminated body to a vacuum state is performed. In this embodiment, the vacuum process and the pressurization process to be described later are performed by a method called prelamination processing by a vacuum laminator. FIG. 6 is a view illustrating an outline of the prelamination processing by the vacuum laminator. In the prelamination processing by the vacuum laminator, a pressure container 61 including two spaces of a first chamber 61A and a second chamber 61B is used. A silicone rubber sheet 64 is provided at a boundary between the first chamber 61A and the second chamber 61B, and an air-tight state is maintained between the first chamber 61A and second chamber 61B. In addition, the first chamber 61A and the second chamber 61B are respectively provided with ventilation holes 62 and 63 and are independently connected to an air pump at the outside. Accordingly, the first chamber 61A and the second chamber 61B can control the degree of independent decompression of the spaces. In addition, a heater is embedded in the bottom surface of the first chamber 61A to heat an object to be processed inside the first chamber 61A.

In S30, the laminated body support structure 50 is disposed inside the first chamber 61A, and both the first chamber 61A and the second chamber 61B are set to the vacuum state so as to remove air that remains in the laminated body support structure 50. The vacuum process of this embodiment is performed at a room temperature.

Returning to FIG. 3, in S40, a pressure is applied to the laminated body 30 with the laminated body support structure 50 (pressurization process). Here, the pressurization process is performed in a state in which the laminated body 30 is heated. In this embodiment, the laminated body 30 is heated with the laminated body support structure 50. In addition, the pressurization process is performed at a pressure of 0.5 atm or less. The pressurization processing in S40 is continuously performed subsequently to the vacuum process in S30, and is performed while the laminated body support structure 50 is kept in a vacuum state in the first chamber 61A of the pressure container 61. In the pressurization process, the first chamber 61A is maintained in a vacuum state, and the inside of the second chamber 61B is pressurized to adjust a pressure difference between the first chamber 61A and the second chamber 61B to match a pressure to be applied to the laminated body 30. For example, when applying 0.5 atm to the laminated body 30, suction in the second chamber 61B is suppressed or stopped so that air equivalent to 0.5 atm flows into the second chamber 61B.

Figure 7:
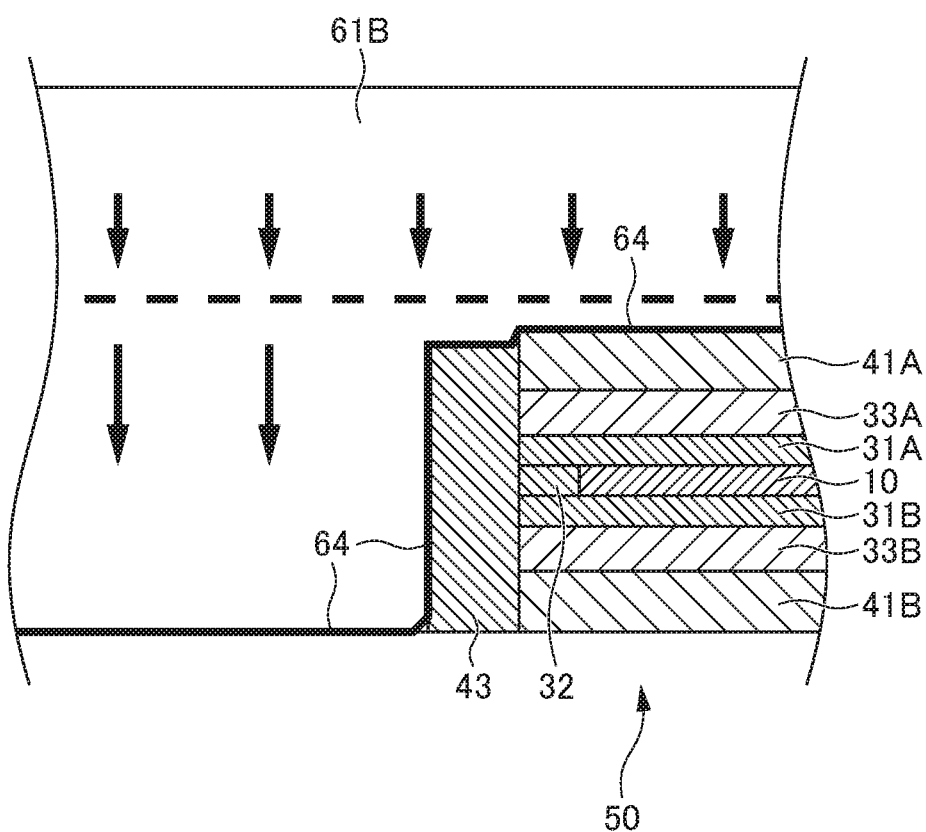
FIG. 7 is a view schematically illustrating a state of a silicone rubber sheet 64 in a pressurization process.

FIG. 7 is a view schematically illustrating a state of the silicone rubber sheet 64 in the pressurization process. When air is conveyed to the second chamber 61B and a pressure is applied from the second chamber 61B to the first chamber 61A, the silicone rubber sheet 64 is pushed toward the first chamber 61A due to the pressure, and the silicone rubber sheet 64 comes into close contact with the laminated body support structure 50, and the pressure is also applied to the laminated body support structure 50. In the pressurization process of this embodiment, the first interlayer forming sheet 31A and the second interlayer forming sheet 31B are maintained in a state of Tg±10° C. and 0.5 atm. When the pressurization process is terminated, prelamination relating to the laminated glass is terminated.

In S50, an autoclave process is performed. In the autoclave process, the laminated body 30 for which prelamination is terminated is moved to a pressure container for an autoclave, and the laminated body 30 is left under a high-pressure and high-temperature environment for a predetermined time, and joining relating to the laminated glass is reinforced to enhance the strength. In this embodiment, the autoclave process is performed by placing the laminated body 30 after the prelamination under an environment of 120° C. and 8 atm (after pressurization process). When the autoclave process is terminated, the laminated glass 1 is completed. Note that, the following cutting process may be performed as necessary.

In S60, a cutting process of cutting out a part of the outer periphery of the laminated body 30 (laminated glass 1) for which the autoclave process is completed is performed. Note that, the cutting process may not be performed.

Next, the spacer 32 will be described in more detail. FIG. 8 is a view summarizing experiment results obtained by examining an influence applied to a prelamination result by a height relationship between the spacer 32 and the liquid crystal film 10. The experiment illustrated in FIG. 8 is an experiment in which a value (a height difference) obtained by subtracting the height of the liquid crystal film 10 from the height of the spacer 32 constituted by a PVB interlayer is changed. The other conditions are set to be constant in the above-described conditions. A size of a test piece (laminated glass) that is used in the experiment is set to a square shape in which one size is 100 mm. The content of determination includes whether or not the biasing of liquid crystal occurs, whether or not air bubbles occur in the liquid crystal film 10, and an adhesion state between the liquid crystal film 10 and the interlayer (the first interlayer forming sheet 31A and the second interlayer forming sheet 31B). Note that, occurrence of the air bubbles is expressed as air bubbles herein, but the occurrence of the air bubbles represents a state in which a space is generated, and it does not matter whether or not the state is vacuum state or whether or not a gas is contained. In determination results, "excellent" represents that biasing of liquid crystal does not occur, and air bubbles does not occur in a cell, "good" represents rare occurrence in a plurality of times of experiments, and "bad" represents frequent occurrence. Determination relating to the adhesion state is determination after the autoclave process, and in determination results, "excellent" represents that satisfactory adhesion state is maintained, "good" represents that adhesion failure rarely occurs in a plurality of times of experiments, and "bad" represents that adhesion failure frequently occurs. Note that, in the determination results including the determination results in FIG. 8 in this specification, determination results of "excellent", "good", and "bad" are used, but even in any case, determination is made on the basis of the above-described criteria. In addition, the determination results of "excellent" and "good" represent that a product can be used, but "bad" indicates that the product cannot be used.

From the results in FIG. 8, it is preferable that the height (thickness) of the spacer 32 is equal to or greater than the height (thickness) of the liquid crystal film 10. In addition, it is preferable that a value (height difference) obtained by subtracting the height of the liquid crystal film 10 from the height of the spacer 32 is 0 mm or greater, and is +0.90 mm or less. It is more preferable that the value (height difference) obtained by subtracting the height of the liquid crystal film 10 from the height of the spacer 32 is +0.12 mm.

FIG. 9 is a view summarizing experiment results obtained by examining an influence applied to the prelamination result by the material of the spacer 32. An experiment illustrated in FIG. 9 is an experiment in which the material of the spacer 32 is changed. The other conditions are set to be constant under the above-described conditions. Note that, the value (height difference) obtained by subtracting the height of the liquid crystal film 10 from the height of the spacer 32 was set to +0.12 mm. As the material of the spacer 32 used in the experiment, a PVB interlayer of the same material as in the first interlayer forming sheet 31A and the second interlayer forming sheet 31B, an EVA interlayer usable as an interlayer different from the PVB interlayer, a PET base material, and a COP base material were used. From the results in FIG. 9, even in any material of the PVB interlayer, the EVA interlayer, the PET base material, and the COP base material, in determination of any of biasing of liquid crystal, in-cell air bubbles, and adhesion between the cell and the interlayer, it was confirmed that the determination result of "bad" is not included, and thus the material can be used as the spacer 32 in a product. More preferably, the PVB interlayer or the EVA interlayer may be used as the material of the spacer 32.

FIG. 10A is a view summarizing experiment results obtained by examining an influence applied to the prelamination result by a shape and an arrangement of the spacer 32 formed by the PVB interlayer. An experiment illustrated in FIG. 10A is an experiment in which the shape and the arrangement of the spacer 32 are changed. The other conditions are set to be constant under the above-described conditions. Note that, the value (height difference) obtained by subtracting the height of the liquid crystal film 10 from the height of the spacer 32 was set to +0.12 mm. FIG. 10B is a view summarizing experiment results obtained by examining an influence applied to the prelamination result by the shape and the arrangement of the spacer 32 formed by the PET base material. In an experiment of FIG. 10B, similar conditions as in FIG. 10A were set except that the material is different. As a combination of the shape and the arrangement of the spacer 32, an experiment was performed with respect to seven aspects described in FIG. 10A and FIG. 10B. The aspects are illustrated in FIG. 11 to FIG. 17.

Figure 11:
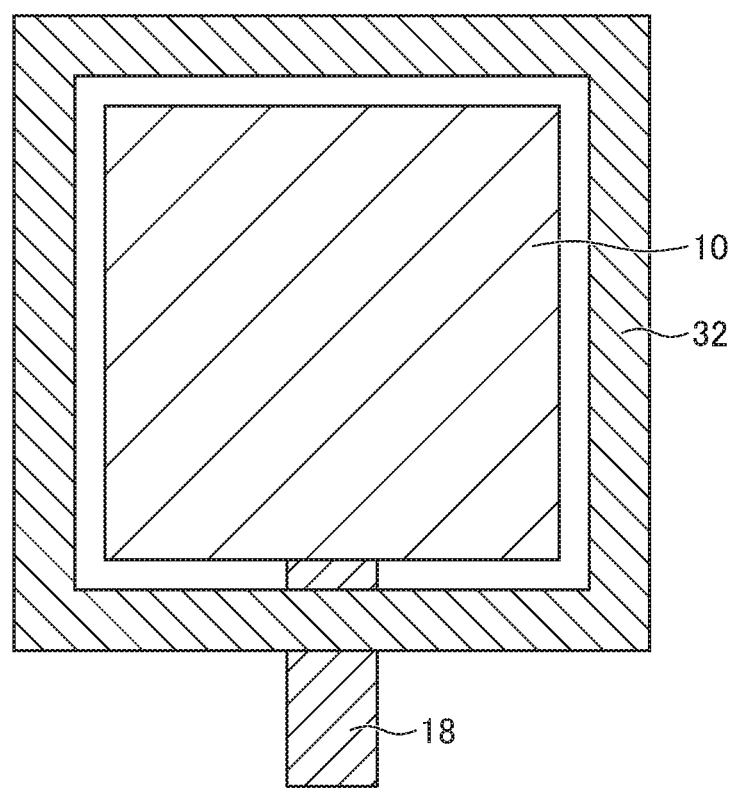
FIG. 11 is a view illustrating an arrangement of the spacer 32 of Aspect 1-1.
Figure 12:
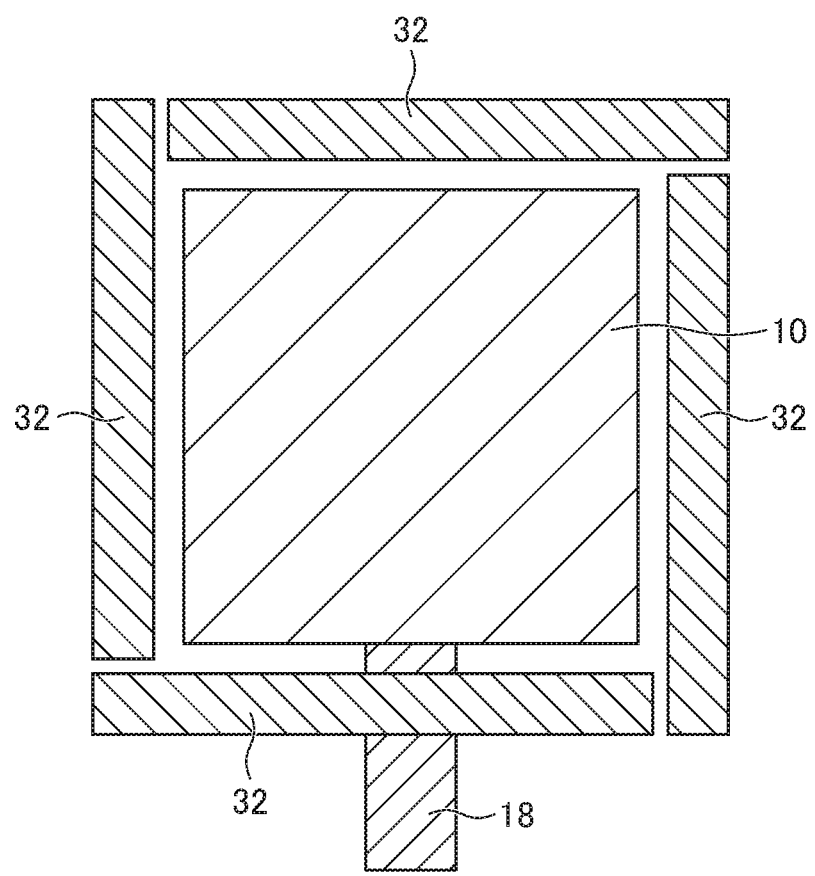
FIG. 12 is a view illustrating an arrangement of the spacer 32 of Aspect 1-2.
Figure 13:
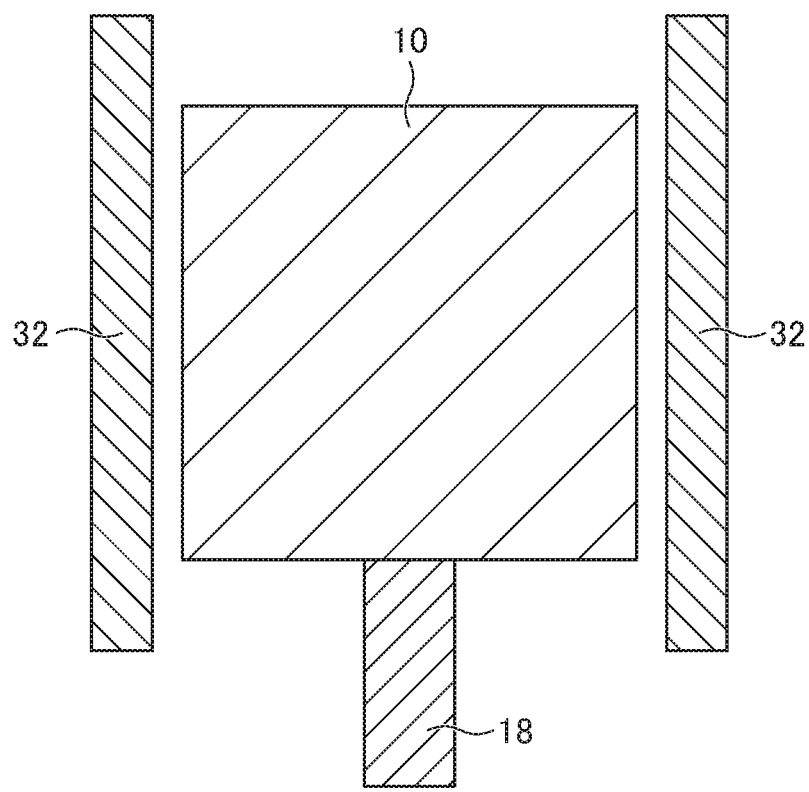
FIG. 13 is a view illustrating an arrangement of the spacer 32 of Aspect 1-3.
Figure 14:
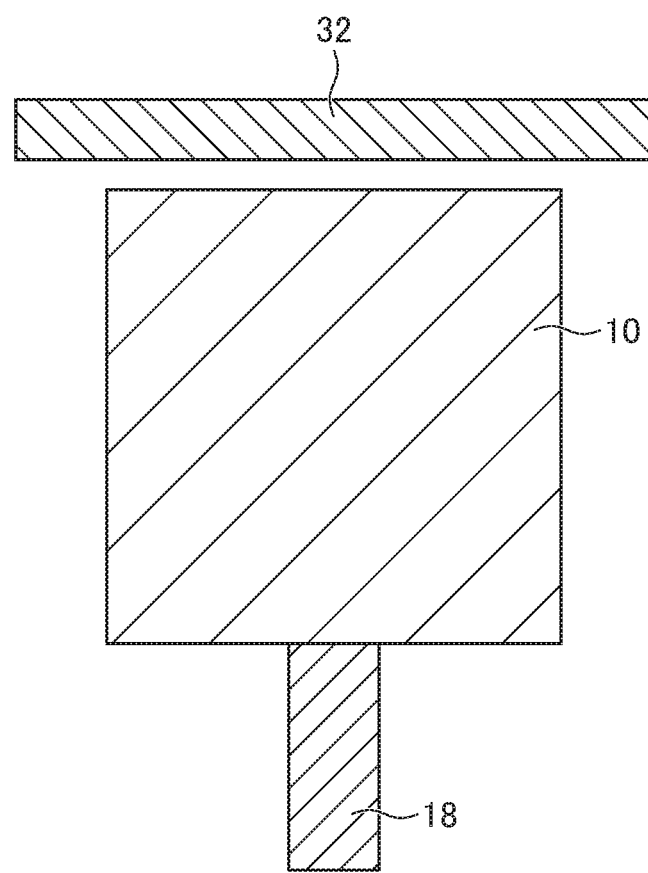
FIG. 14 is a view illustrating an arrangement of the spacer 32 of Aspect 1-4.
Figure 15:
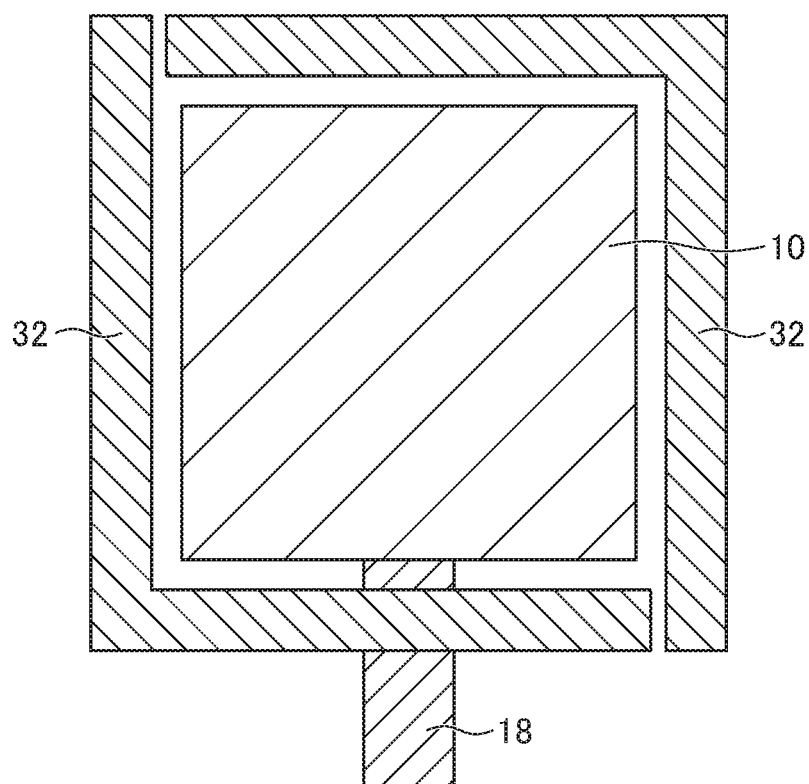
FIG. 15 is a view illustrating an arrangement of the spacer 32 of Aspect 1-5.
Figure 16:
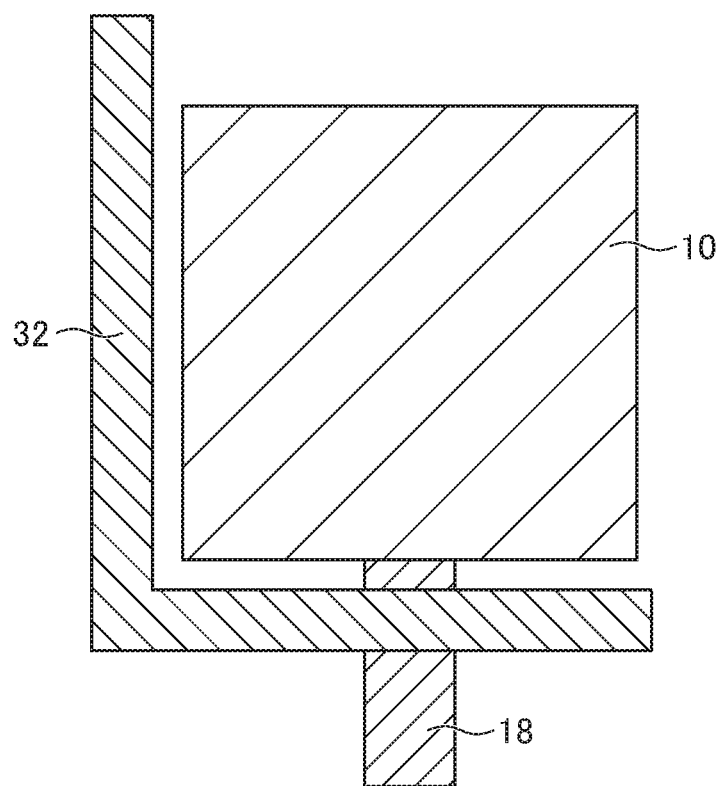
FIG. 16 is a view illustrating an arrangement of the spacer 32 of Aspect 1-6.
Figure 17:
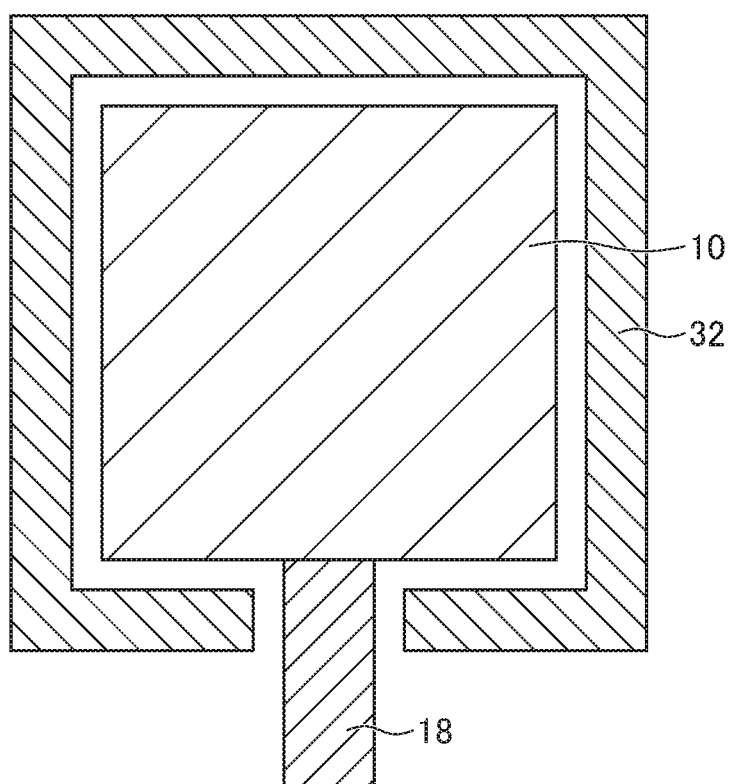
FIG. 17 is a view illustrating an arrangement of the spacer 32 of Aspect 1-7.

FIG. 11 is a view illustrating an arrangement of the spacer 32 of Aspect 1-1. Aspect 1-1 is an aspect in which a frame-shaped spacer 32 surrounding the entirety of the outer periphery of the liquid crystal film 10 is disposed as illustrated in FIG. 11. FIG. 12 is a view illustrating an arrangement of the spacer 32 of Aspect 1-2. Aspect 1-2 is an aspect in which four line-shaped spacers 32 are arranged as illustrated in FIG. 12. FIG. 13 is a view illustrating an arrangement of the spacer 32 of Aspect 1-3. Aspect 1-3 is an aspect in which two line-shaped spacers 32 are arranged at two sides opposite to each other with the liquid crystal film 10 interposed therebetween as illustrated in FIG. 13. FIG. 14 is a view illustrating an arrangement of the spacer 32 of Aspect 1-4. Aspect 1-4 is an aspect in which one line-shaped spacer 32 is disposed as illustrated in FIG. 14. FIG. 15 is a view illustrating an arrangement of the spacer 32 of Aspect 1-5. Aspect 1-5 is an aspect in which two L-shaped spacers 32 are arranged as illustrated in FIG. 15. FIG. 16 is a view illustrating an arrangement of the spacer 32 of Aspect 1-6. Aspect 1-6 is an aspect in which one L-shaped spacer 32 is disposed as illustrated in FIG. 16. FIG. 17 is a view illustrating an arrangement of the spacer 32 of Aspect 1-7. Aspect 1-7 is an aspect in which a rectangular spacer 32 is disposed to surround the entirety of the outer periphery of the liquid crystal film 10 except for a position of the flexible printed wiring substrate 18 as illustrated in FIG. 17.

From the results in FIG. 10A and FIG. 10B, it was confirmed that it is preferable to dispose the spacer 32 at two sides opposite to each other with at least the liquid crystal film 10 interposed therebetween. In addition, it is more preferable that the spacer 32 is disposed to surround the entirety of the outer periphery of the liquid crystal film 10. In addition, in the case of the PVB interlayer in FIG. 10A, it was confirmed that it is preferable to evenly dispose the spacer 32 in comparison to a case where the PVB interlayer does not overlap the position of the flexible printed wiring substrate 18 as in Aspect 1-7. On the other hand, in the case of the PET base material in FIG. 10B, the PET base material is less likely to be deformed even when being heated, and thus it is preferable that the PET base material is disposed so as not to overlap the position of the flexible printed wiring substrate 18. In addition, from the results in FIG. 10A, it was confirmed that Aspect 1-4 and Aspect 1-6 include a determination result of "bad" and thus using as a product is not possible, but the other Aspects do not include the determination result of "bad", and thus using as a product is possible.

Next, an occupancy rate of the interlayer in the laminated glass will be described. Here, the occupancy rate is a percentage of area ratio of a region in which the liquid crystal film 10 and the spacer 32 are disposed in a region between the first glass plate 33A and the second glass plate 33B. Note that, it is assumed that a value of the occupancy rate is a value in a member dimension before performing the prelamination. Ideally, it can be said that the value is preferably set to 100%. However, when the value is set to 100%, there is a concern that the spacer 32 may be disposed to overlap the liquid crystal film 10 when considering a dimensional variation or an assembling variation. Accordingly, it was examined how large a gap is desirable to be provided between the spacer 32 and the liquid crystal film 10 by using the occupancy rate as a parameter.

Figure 19:
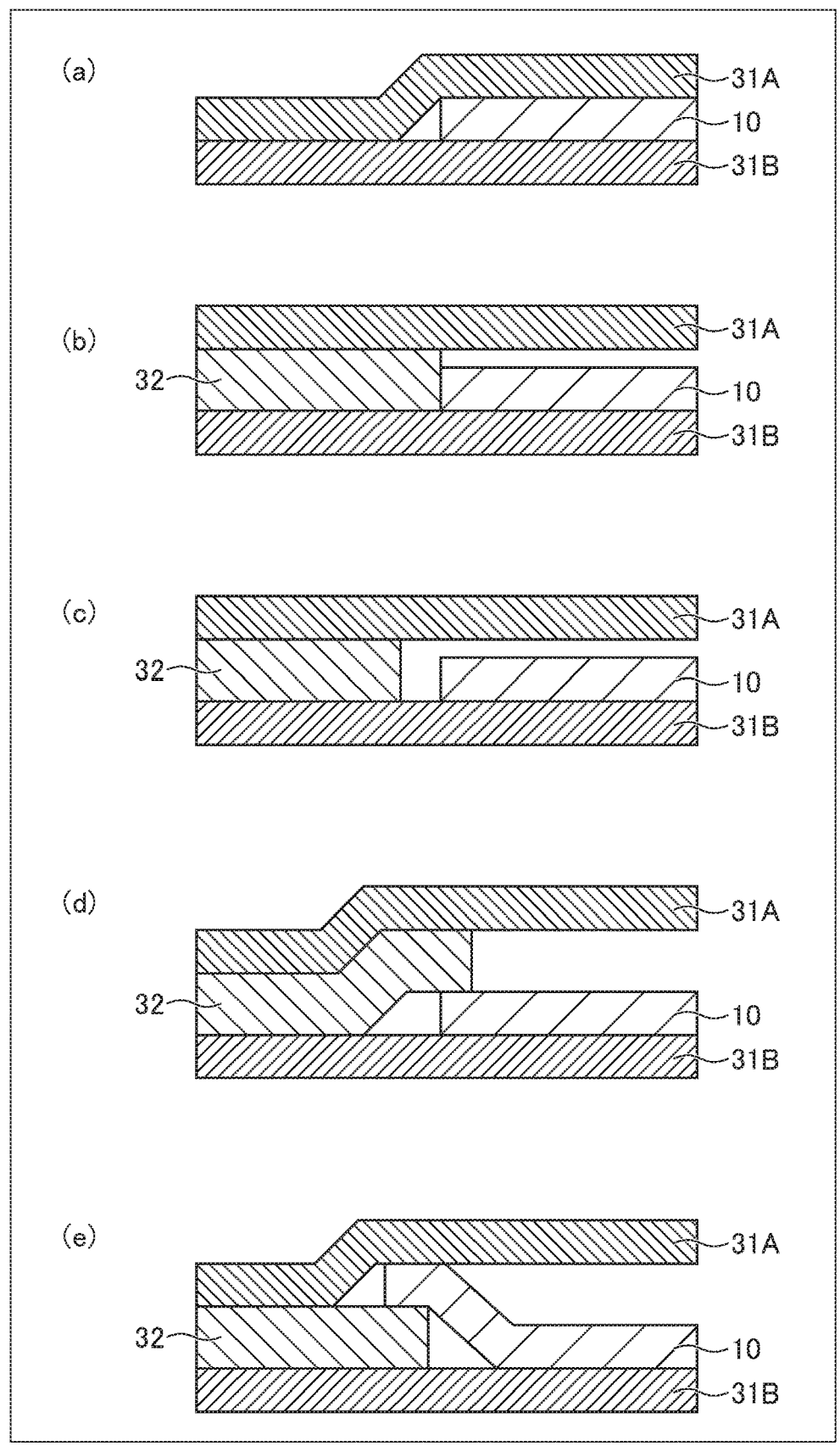
FIG. 19 is a view illustrating respective aspects in FIG. 18.

FIG. 18 is a view summarizing experiment results obtained by examining an influence applied to the prelamination result by occupancy rate of the spacer 32. FIG. 19 is a view illustrating respective aspects in FIG. 18. Note that, FIG. 19 is a view schematically illustrating a state immediately after depositing process for explanation, that is, the state in which respective layers are simply disposed to overlap each other and the respective layers are not melted or joined to each other because heat is not applied to the respective layers, and does not illustrate a lamination state of the laminated glass 1 after being produced. An experiment illustrated in FIG. 18 is an experiment in which the occupancy rate of the spacer 32 is changed. Determination on interlayer air bubbles illustrated in FIG. 18 represents a result obtained by determining an occurrence situation of air bubbles remaining in an interlayer portion. Determination criteria are similar as in the determination criteria of the in-cell air bubbles.

Aspect 2-1 is an aspect in which the spacer 32 is not provided, and the occupancy rate is 99%. Note that, in Aspect 2-1, with regard to definition of the occupancy rate, since the spacer 32 is not disposed, the occupancy rate becomes a lower value. However, as illustrated in FIG. 19(a), since the second interlayer forming sheet 31B is joined to the first interlayer forming sheet 31A and substantially fills a space, a triangular void illustrated in FIG. 19(a) remains and the occupancy rate was calculated as 99%.

In Aspect 2-2, the gap between the spacer 32 and the liquid crystal film 10 is 0, and the occupancy rate is 100%. FIG. 19(b) illustrates Aspect 2-2. Aspect 2-3 and Aspect 2-4 represent a case where the gap between the spacer 32 and the liquid crystal film 10 is 0 and the occupancy rate is 100%, but overlapping with the liquid crystal film 10 occurs. FIG. 19(d) illustrates Aspect 2-3 and FIG. 19(e) illustrates Aspect 2-4. In Aspect 2-5, the gap between the spacer 32 and the liquid crystal film 10 is 1 mm, and the occupancy rate is 91%. FIG. 19(c) illustrates Aspect 2-5.

In addition, an experiment was performed for comparison by producing an object in which the shape of the liquid crystal film 10 was changed so as to further lower the occupancy rate. Aspect 2-6 is an aspect in which the occupancy rate is lowered by setting a corner of the liquid crystal film 10 to R=20 mm, and the occupancy rate is 85%. Aspect 2-7 is an aspect in which the occupancy rate is lowered by setting the shape of the liquid crystal film 10 to a circular shape having a radius R of 40 mm, and the occupancy rate is 69%. Note that, the shape of the spacer 32 is a frame-shape in any case.

As illustrated in FIG. 18, when the occupancy rate is set to 100% by setting the gap between the spacer 32 and the liquid crystal film 10 is set to 0, in a case where both the spacer 32 and the liquid crystal film 10 are appropriately disposed (Aspect 2-2), a satisfactory result is obtained, but in a case where both the spacer 32 and the liquid crystal film 10 overlap each other, a worse result is obtained (Aspect 2-3 and Aspect 2-4). On the other hand, in an aspect (Aspect 2-6 and Aspect 2-7) in which the occupancy rate is excessively lowered, a much worse result is obtained. Accordingly, as in Aspect 2-5, it can be said that it is preferable to dispose the spacer 32 and the liquid crystal film 10 while appropriately leaving a gap therebetween. More specifically, it is preferable that the occupancy rate is set to 91% or greater, and the gap between the spacer 32 and the liquid crystal film 10 is left by 1 mm. In this case, voids exist between the spacer 32 and the liquid crystal film 10 before the prelamination, but after the prelamination, the first interlayer forming sheet 31A and the second interlayer forming sheet 31B appropriately enter a portion where the voids exist, and the spacer 32 also enters the voids, and thus the voids are filled with these members.

As described above, in this embodiment, since the spacer 32 is disposed, a success rate of the prelamination is significantly improved. The reason for this will be described. In the liquid crystal film 10, the liquid crystal layer is formed at the inside thereof, and thus the laminated glass that sandwiches the liquid crystal film 10 sandwiches a soft material that is impossible in the laminated glass of the related art. Accordingly, in the pressurization process of the prelamination, even when a portion to which a pressure is applied is slightly biased, the liquid crystal layer flows under the influence, and thus accumulation of liquid crystal or voids occur in the liquid crystal film 10. Particularly, in a prelamination process by a vacuum laminator, it is considered that the silicone rubber sheet 64 pressurizes an outer peripheral portion of the laminated body 30 at the time of pressurization, that is, an outer peripheral portion of the first glass plate 33A or the second glass plate 33B, and thus the first glass plate 33A or the second glass plate 33B is distorted.

In this embodiment, in a case where the spacer 32 is disposed at the periphery, even when a pressure is applied to the outer peripheral portion of the first glass plate 33A or the second glass plate 33B, since the spacer 32 can suppress deformation of the first glass plate 33A or the second glass plate 33B, and it is possible to evenly apply a pressure to the first glass plate 33A and the second glass plate 33B. Accordingly, appropriate prelamination can be performed without causing unnecessary flow or the like to occur in the liquid crystal layer. Accordingly, it is possible to provide a method for producing the laminated glass which is capable of reducing accumulation of liquid crystal or occurrence of voids.

In addition, in this embodiment, since the sealing material 25 is disposed to surround the periphery of the liquid crystal layer 14 of the liquid crystal film 10, and the spacer 32 is disposed at the periphery of the liquid crystal film 10, in a plan view, an outer side of the sealing material 25 is surrounded by the spacer 32. As to be described later, when the sealing material 25 is irradiated with solar light for long time, there is a concern that the sealing material 25 may deteriorate depending on the material of the sealing material 25, and when the sealing material 25 deteriorates, there is a concern that a sealing function thereof deteriorates, and thus the liquid crystal layer 14 may be leaked. However, in this embodiment, in a plan view, since the outer side of the sealing material 25 is surrounded by the spacer 32, light from a lateral surface of the laminated glass 1 can be shielded by the spacer 32 so as not to directly reach the sealing material 25, and thus it is possible to prevent deterioration of the sealing material 25. This effect is significantly obtained in a case where the spacer 32 is disposed to surround the entirety of the outer periphery of the liquid crystal film 10, that is, in a case where the spacer 32 is disposed to surround the entirety of the periphery of the outer side of the sealing material 25. However, parts of the spacer may be disposed discontinuously as long as the spacer 32 is disposed at the outer periphery of the liquid crystal film 10.

Note that, in the above-described experiment, one side is set to 100 mm, obtainment of a satisfactory prelamination result is confirmed by using the laminated glass in which one side is 300 mm as long as the support body is disposed at an appropriate position, and from the result, it could be confirmed that a similar result will be obtained in larger-sized laminated glass.

Second Embodiment

Figure 20:
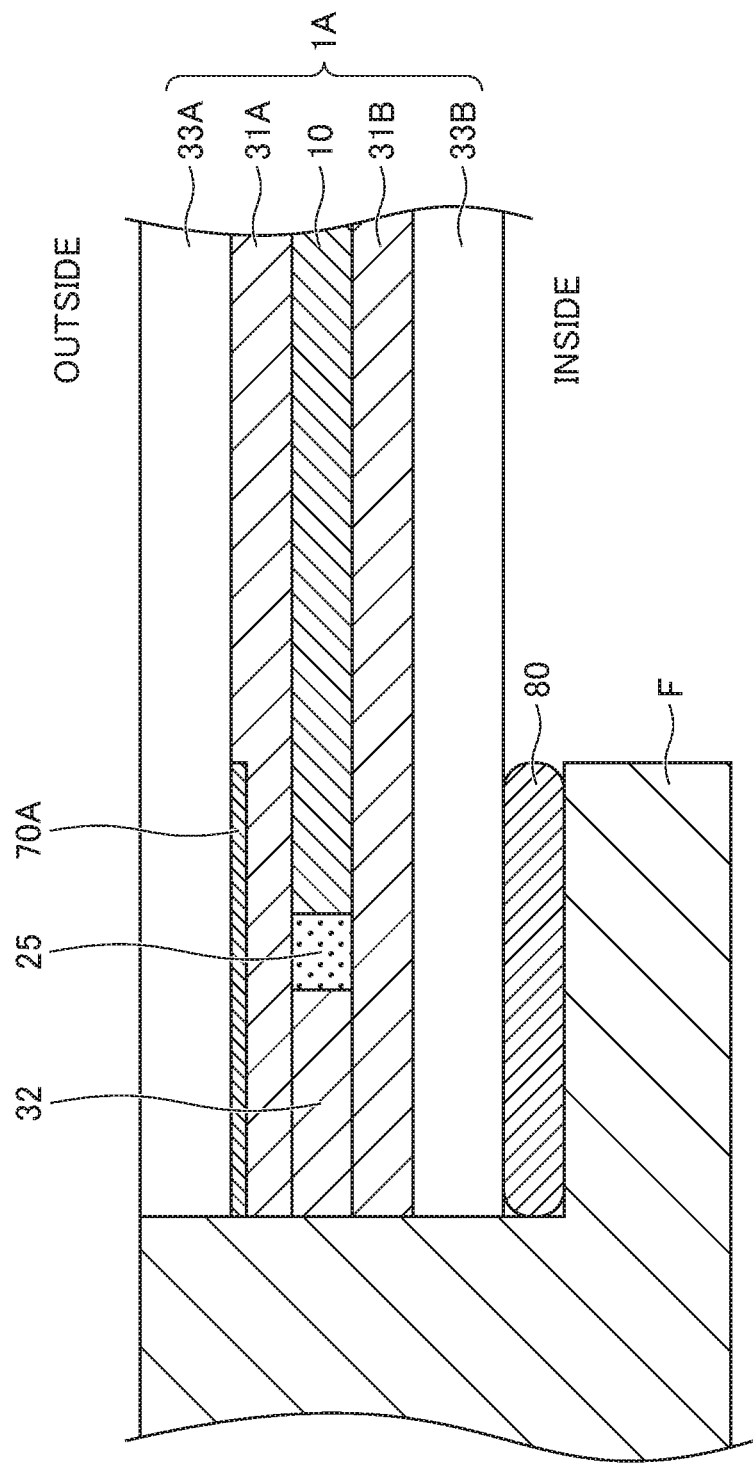
FIG. 20 is a cross-sectional view illustrating a use state in which laminated glass 1A of a second embodiment is attached to a frame F.

FIG. 20 is a cross-sectional view illustrating a use state in which laminated glass 1A of a second embodiment is attached to a frame F. In the second embodiment and a third embodiment to be described later, description will be given of a configuration in which the laminated glass 1A (1B) is fixed and attached to the frame (window frame) F. The laminated glass 1A of the second embodiment is set to a configuration in which a configuration necessary in actual use is further added, but a basic configuration is similar as in the laminated glass 1 of the first embodiment. Accordingly, the same reference numeral will be given to a portion having a similar function as in the first embodiment, and redundant description will be appropriately omitted. A cross-section in FIG. 20 illustrates a state in which the laminated glass 1A is attached to the frame F by cutting the vicinity of an end of the laminated glass 1A. In the laminated glass 1A, the layer configuration illustrated in FIG. 20 is formed over the whole periphery, and the layer configuration is attached to the frame F with an adhesive 80. Note that, in the case of attaching the laminated glass 1A to a vehicle, for example, a vehicle body corresponds to the frame F, and in the case of attaching the laminated glass 1A to a building, for example, a window frame corresponds to the frame F. In addition, in FIG. 20, a lower side is set to an inner side of a vehicle or an indoor side, and an upper side is set to an outer side of the vehicle or an outdoor side, and the sides are illustrated as "inside" and "outside" in the drawing.

The laminated glass 1A of the second embodiment is different from the laminated glass 1 of the first embodiment in that a light-shielding part 70A is further provided. The light-shielding part 70A is constituted by a material having an operation of shielding at least light of a wavelength in an ultraviolet region, and shields light that reaches the sealing material 25 from the outside. The light-shielding part 70A is disposed at the whole periphery along an outer periphery of the laminated glass. The light-shielding part 70A may exhibit the light-shielding function, and may be constituted as a light absorbing part that shields light by a light absorbing operation or a light reflecting part that shields light by a light reflecting operation.

The light-shielding part 70A of the second embodiment is disposed from an end surface of the laminated glass 1A to a position on an inner side in comparison to the sealing material 25. In addition, the light-shielding part 70A of the second embodiment is disposed at a position between the liquid crystal film 10 and the first glass plate 33A. More specifically, in this embodiment, the light-shielding part 70A is provided between the first glass plate 33A and the first interlayer 31A. A specific aspect and a specific producing method for forming the light-shielding part 70A may be arbitrary. For example, the light-shielding part 70A may be formed on the first glass plate 33A or on the first interlayer 31A through printing. In the case of forming the light-shielding part 70A on the first glass plate 33A through printing, for example, it is possible to form the light-shielding part 70A by printing and drying liquid black ceramic. In addition, in the case of forming the light-shielding part 70A on the first interlayer 31A through printing, for example, carbon black or the like can be used as ink. In addition, the light-shielding part 70A may be constituted by disposing a light-shielding film or the like between the first glass plate 33A and the first interlayer 31A. In the case of forming the light-shielding part 70A by disposing the light-shielding film or the like, for example, a PET base material colored to black, or the like can be used as a material of the light-shielding part 70A. Note that, in the configuration in which the light-shielding film or the like is disposed between the first glass plate 33A and the first interlayer 31A, it is assumed a case where an adhesive force between the light-shielding film or the like and the first glass plate 33A is insufficient. In this case, an interlayer or like may be further disposed between the light-shielding film or the like and the first glass plate 33A.

As illustrated in FIG. 20, the laminated glass 1A is attached to the frame F in a state in which the first glass plate 33A is set to an outer side of a vehicle or an outdoor side, and the second glass plate 33B is set to an inner side of a vehicle or an indoor side. Here, the frame F of the second embodiment is configured to extend to an inner side of the laminated glass 1A in comparison to a position of the sealing material 25. Accordingly, light that reaches the sealing material 25 from an end of the laminated glass 1A, the inner side of the vehicle, or the indoor side is shielded by the frame F. In addition, in appearance, the sealing material 25 is blocked by the frame F and is hidden so as not to be seen from the inner side of the vehicle or the indoor side. On the other hand, with regard to light propagating toward the sealing material 25 from the outside of the vehicle or the outdoor side, in a case where the light-shielding part 70A is not disposed, the sealing material 25 is irradiated with solar light or the like from the outside of the vehicle or the outdoor side. When the sealing material 25 is irradiated with the solar light for long time, there is a concern that the sealing material 25 may deteriorate depending on the material of the sealing material 25. When the sealing material 25 deteriorates, there is a concern that a sealing function thereof deteriorates, and thus the liquid crystal layer 14 may be leaked. In this embodiment, since the light-shielding part 70A is disposed at the above-described position, the sealing material 25 is prevented from being directly irradiated with light, and deterioration of the sealing material 25 is prevented. In addition, the sealing material 25 is hidden by the light-shielding part 70A from the outside of the vehicle or the outdoor side, and thus the design of the sealing material 25 can be improved.

As described above, according to the second embodiment, the sealing material 25 is prevented from being directly irradiated with light, deterioration of the sealing material 25 can be prevented, and the design of the sealing material 25 can be improved. In addition, even in a case where the frame F does not have light-shielding properties, since the spacer 32 is disposed, light from a lateral surface direction of the laminated glass is shielded so as not to directly reach the sealing material 25, and thus it is possible to prevent deterioration of the sealing material 25.

Third Embodiment

Figure 21:
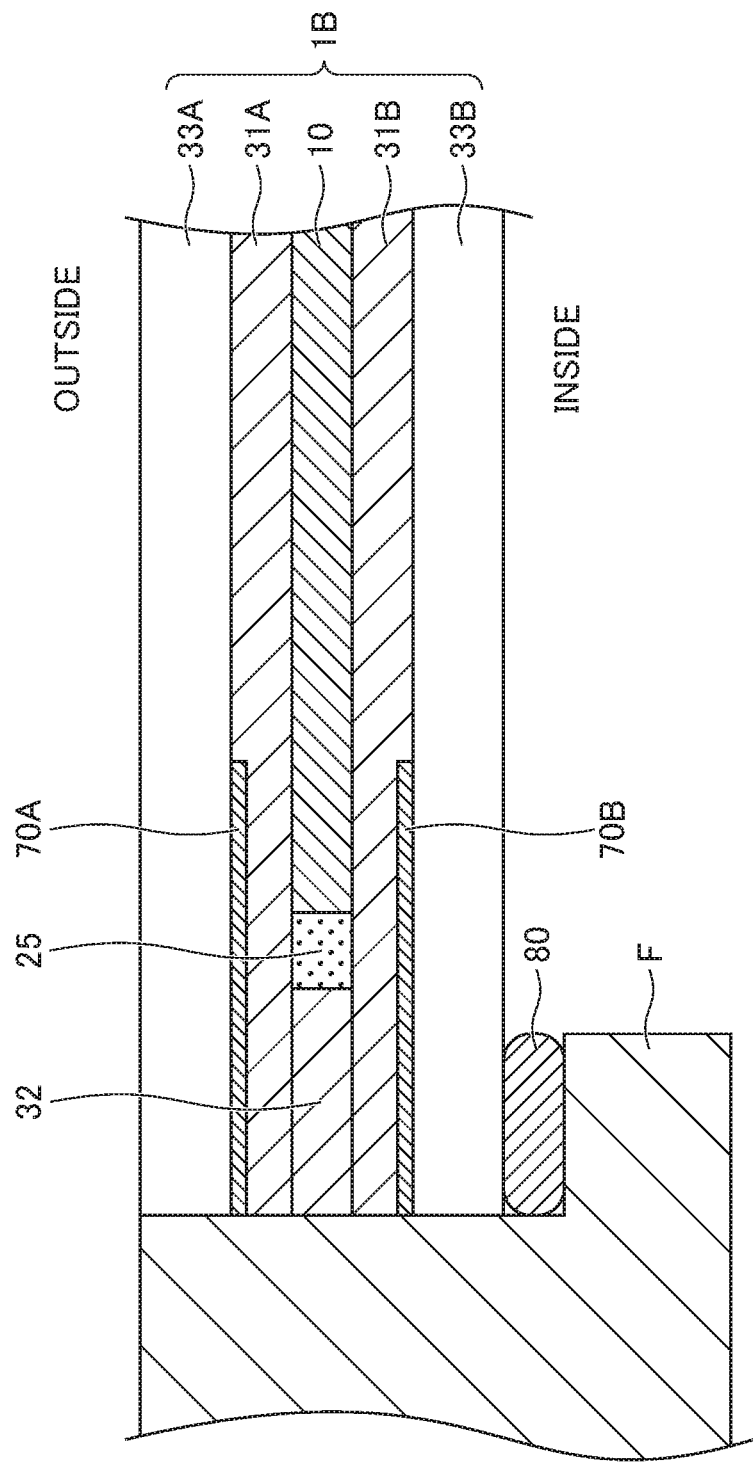
FIG. 21 is a cross-sectional view illustrating a use state in which laminated glass 1B of a third embodiment is attached to the frame F.

FIG. 21 is a cross-sectional view illustrating a use state in which laminated glass 1B of a third embodiment is attached to the frame F. The laminated glass 1B of the third embodiment is different from the second embodiment in that light-shielding parts 70A and 70B are provided, but a basic configuration is similar as in the laminated glass 1A of the second embodiment. Accordingly, the same reference numeral will be given to a portion having a similar function as in the second embodiment, and redundant description will be appropriately omitted.

In the third embodiment, two (two-layer) light-shielding parts including the light-shielding part 70A and the light-shielding part 70B are provided. The light-shielding part 70A of the third embodiment is constituted in a similar manner as in the light-shielding part 70A of the second embodiment. The light-shielding part 70B of the third embodiment is disposed at a position between the liquid crystal film 10 and the second glass plate 33B. More specifically, in this embodiment, the light-shielding part 70B is provided between the second glass plate 33B and the second interlayer 31B. The other configurations of the light-shielding part 70B, a forming method thereof, and the like are similar as in the light-shielding part 70A of the first embodiment.

As described above, in the third embodiment, the light-shielding part (70A or 70B) is disposed at both a position between the liquid crystal film 10 and the first glass plate 33A, and a position between the liquid crystal film 10 and the second glass plate 33B. Accordingly, with regard to light from a direction of any of a front side and a rear side of the laminated glass 1A, it is possible to prevent the light from reaching the sealing material 25. In addition, when being from any of the front side and the rear side, the sealing material 25 can be hidden and thus the design of the sealing material 25 can be improved. Accordingly, for example, even in a case where the frame F only reaches an outer side of the sealing material 25 as illustrated in FIG. 21, it is possible to shield light that reaches the sealing material 25 from the inner side of the vehicle or the indoor side. Accordingly, in the laminated glass 1B of the third embodiment, deterioration of the sealing material 25 can be prevented, and the sealing material 25 can be hidden so as not to be seen. In addition, in a case where the laminated glass 1B has a flat plate shape, it is possible to use the laminated glass 1B without discriminating the front side and the rear side, and thus workability can be improved. In addition, even in a case where the frame F does not have light-shielding properties, since the spacer 32 is disposed, light from a lateral surface direction of the laminated glass is shielded so as not to directly reach the sealing material 25, and thus it is possible to prevent deterioration of the sealing material 25.

Fourth Embodiment

Figure 22:
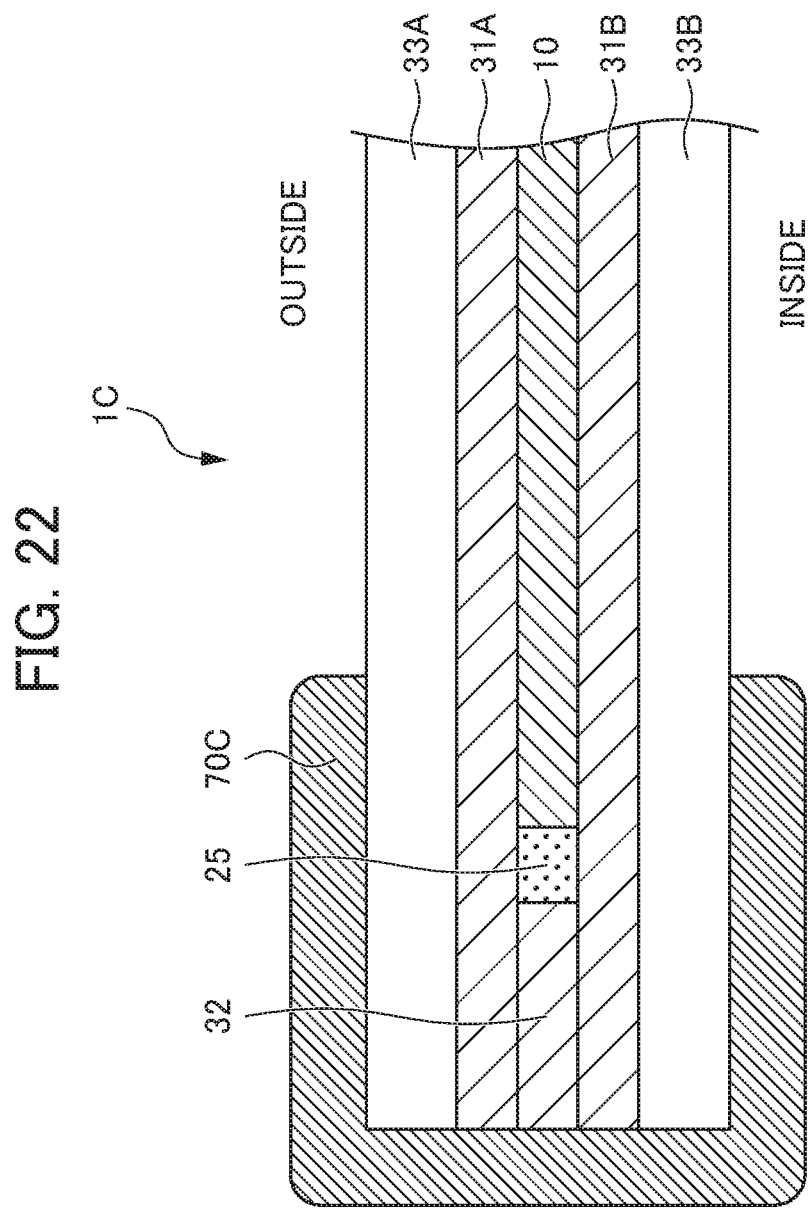
FIG. 22 is a cross-sectional view illustrating the vicinity of an end of laminated glass 1C of a fourth embodiment.

FIG. 22 is a cross-sectional view illustrating the vicinity of an end of laminated glass 1C of a fourth embodiment. In the fourth embodiment and a fifth embodiment to be described later, description will be given with reference to laminated glass 1C (1D) that can be used in a slidably opened/closed window of a vehicle or the like. A cross-section illustrated in FIG. 22 illustrates the vicinity of an end of a portion to be separated and exposed from a frame of a vehicle or the like by cutting the vicinity of the end in a state in which the laminated glass 1C capable of being used as the slidably opened/closed window is opened. The laminated glass 1C of the fourth embodiment is set to a configuration in which a configuration necessary in actual use is further added, but a basic configuration is similar as in the laminated glass 1 of the first embodiment. Accordingly, the same reference numeral will be given to a portion having a similar function as in the first embodiment, and redundant description will be appropriately omitted.

The laminated glass 1C of the fourth embodiment is different from the laminated glass 1 of the first embodiment in that a light-shielding part 70C is provided. The light-shielding part 70C is constituted by a material having an operation of shielding at least light of a wavelength in an ultraviolet region, and shields light that reaches the sealing material 25 from the outside. The light-shielding part 70C is disposed to cover an end surface of the laminated glass 1C, and to sandwich the laminated glass 1C from the end surface up to a position on an inner side in comparison to the sealing material 25. In addition, the position where the light-shielding part 70C is disposed is a position conforming to the outer periphery of the laminated glass, and is disposed at least along an end that is exposed when the window is set to an open state. Note that, the light-shielding part 70C may not be provided at a portion that is hidden inside a vehicle body or the like at the vicinity of an end on a side to which a window opening and closing mechanism is connected. The light-shielding part 70C may exhibit the light-shielding function, and may be constituted as a light absorbing part that shields light by a light absorbing operation or a light reflecting part that shields light by a light reflecting operation.

A specific aspect and a specific producing method for forming the light-shielding part 70C may be arbitrary. For example, the light-shielding part 70C may be constituted through fitting and adhesion of a resin molded part, may be constituted through application of a resin, paint, or the like, or may be constituted through lamination of tapes, sheets, or the like.

According to the fourth embodiment, since the laminated glass 1C includes the light-shielding part 70C, it is possible to shield light so as not to directly reach the sealing material 25, and thus it is possible to prevent deterioration of the sealing material 25. In addition, since the spacer 32 is disposed, the sealing material 25 can be disposed on an inner side of the laminated glass in a state of being spaced apart from a lateral surface, and thus the light from the lateral surface direction of the laminated glass can be shielded so as not to directly reach the sealing material 25, and deterioration of the sealing material 25 can be prevented.

Fifth Embodiment

Figure 23:
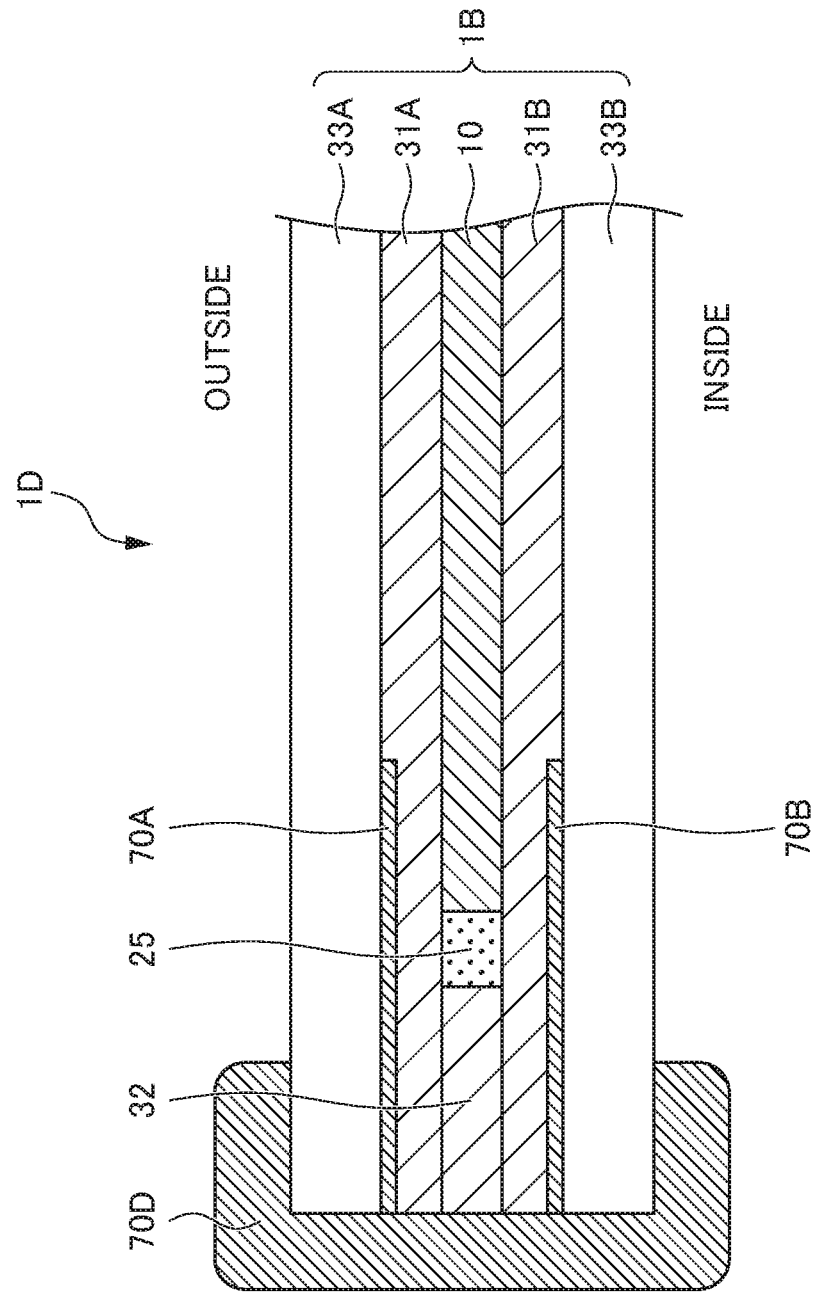
FIG. 23 is a cross-sectional view illustrating the vicinity of an end of laminated glass 1D of a fifth embodiment.

FIG. 23 is a cross-sectional view illustrating the vicinity of an end of laminated glass 1D of a fifth embodiment. The laminated glass 1D of the fifth embodiment is set to a configuration in which a configuration necessary in actual use is further added, but a basic configuration is similar as in the laminated glass 1B of the third embodiment. Accordingly, the same reference numeral will be given to a portion having a similar function as in the third embodiment, and redundant description will be appropriately omitted.

The laminated glass 1D of the fifth embodiment is equivalent to an aspect in which a light-shielding part 70D is further added to the laminated glass 1B of the third embodiment. In addition, the laminated glass 1D of the fifth embodiment is different from the laminated glass 1B of the third embodiment also in that the laminated glass 1D can be used in a slidably opened/closed form. Basically, the light-shielding part 70D has a similar configuration as in the light-shielding part 70C of the fourth embodiment, but the light-shielding part 70D is different from the light-shielding part 70C of the fourth embodiment in that the light-shielding part 70D is disposed to sandwich the laminated glass 1D from the end surface to only up to a position on an outer side in comparison to the sealing material 25.

The light-shielding part 70C of the fourth embodiment as described above is provided at the end of the laminated glass, but the light-shielding part 70C becomes visually remarkable when the window is opened. Accordingly, from the viewpoint of improving the design, the light-shielding part 70C may be desired to be smaller. In this case, as illustrated in FIG. 23, the light-shielding part 70D may not reach up to the sealing material 25. In this case, as illustrated in FIG. 23, when the light-shielding parts 70A and 70B are disposed in combination with the light-shielding part 70D, it is possible to shield light that reaches the sealing material 25, and it is possible to prevent deterioration of the sealing material 25. In addition, since the spacer 32 is disposed, the sealing material 25 can be disposed on an inner side of the laminated glass in a state of being spaced apart from a lateral surface, and thus the light from the lateral surface direction of the laminated glass can be shielded so as not to directly reach the sealing material 25, and deterioration of the sealing material 25 can be prevented.

Modified Embodiment

Various modifications and changes can be made without limitation to the above-described embodiments, and it should be understood that these modifications and changes are also within the scope of the invention.

(1) In the respective embodiments, description has been described of the VA type liquid crystal film, but the invention is not limited to the type, and may employ other types capable of adjusting a light control amount by a potential difference. For example, a twisted nematic (TN) type may be used for a liquid crystal film of a type other than the VA type. In the TN type liquid crystal film, when a voltage is not applied, liquid crystal molecules are aligned horizontally, and light is allowed to pass through a screen, and thus the screen becomes "white". When a voltage is gradually applied, the liquid crystal molecules are aligned vertically, and light is shielded, and thus the screen becomes black.

(2) In the respective embodiments, description has been described with respect to a case where the liquid crystal cell is sandwiched by the linear polarization plates to form the liquid crystal film. However, the invention is not limited to the case, and is widely applicable to the case of forming the liquid crystal film by using a liquid crystal layer with guest-host type liquid crystal while omitting the linear polarization plates.

(3) In the first embodiment, description has been given with reference to an example in which the inclination mitigation member 34 has a rectangular shape, and is disposed at a position that is opposite to the flexible printed wiring substrate 18. There is no limitation to the example, and for example, a frame-shaped inclination mitigation member may be disposed, and the shape and the arrangement of the inclination mitigation member can be appropriately changed.

(4) In the first embodiment, description has been given with reference to an example in which prelamination processing by a vacuum laminator is used in the pressurization process. There is no limitation to the example, and for example, the pressurization process may be performed by using a thermal laminator, and the invention is also applicable to a vacuum bag method or a tube method.

(5) In the second embodiment to the fifth embodiment, description has been given with reference to a configuration provided with the spacer 32. There is no limitation to the configuration, and for example, laminated glass without the spacer 32 is also possible.

Note that, the respective embodiments and modified embodiments may be used in appropriate combination, but detailed description thereof will be omitted. In addition, the invention is not limited to the above-described respective embodiments.

EXPLANATION OF REFERENCE NUMERALS

1 LAMINATED GLASS
10 LIQUID CRYSTAL FILM
12 FIRST LAMINATED BODY FOR LIQUID CRYSTAL
13 SECOND LAMINATED BODY FOR LIQUID CRYSTAL
14 LIQUID CRYSTAL LAYER
15 LIQUID CRYSTAL CELL
16 LINEAR POLARIZATION PLATE
17 LINEAR POLARIZATION PLATE
18 FLEXIBLE PRINTED WIRING SUBSTRATE
21A BASE MATERIAL
21B BASE MATERIAL
22A FIRST ELECTRODE
22B SECOND ELECTRODE
23A ALIGNMENT LAYER
23B ALIGNMENT LAYER
24 IN-LIQUID-CRYSTAL SPACER
25 SEALING MATERIAL
30 LAMINATED BODY
31A FIRST INTERLAYER FORMING SHEET (FIRST INTERLAYER)
31B SECOND INTERLAYER FORMING SHEET (SECOND INTERLAYER)
32 SPACER
33A FIRST GLASS PLATE
33B SECOND GLASS PLATE
34 INCLINATION MITIGATION MEMBER
41A FIRST BACKING PLATE
41B SECOND BACKING PLATE
43 SUPPORT BODY
50 LAMINATED BODY SUPPORT STRUCTURE
61 PRESSURE CONTAINER
61A FIRST CHAMBER
61B SECOND CHAMBER
62 VENTILATION HOLE
63 VENTILATION HOLE
64 SILICONE RUBBER SHEET
70A, 70B, 70C, 70D LIGHT-SHIELDING PART
80 ADHESIVE
F FRAME

The invention claimed is:
1. A laminated glass, comprising:
a first glass plate;
a first interlayer;
a liquid crystal film;
a second interlayer; and
a second glass plate, each being layered and disposed in this order,
wherein the liquid crystal film includes a pair of linear polarization plates, a pair of alignment layers, a pair of base materials, a liquid crystal layer and a sealing material that is disposed to seal the liquid crystal layer and surrounds a periphery of the liquid crystal layer,
the first glass plate and the second glass plate have an outer shape larger than an outer shape of the liquid crystal film,
a spacer is disposed in at least a part of a region which is interposed between the first glass plate and the second glass plate and in which the liquid crystal film is not disposed, and wherein:
the spacer surrounds an entirety of an outer periphery of the liquid crystal film;
an outer side of the sealing material is surrounded by the spacer in a plan view,
in a case an occupancy rate is defined as a percentage of an area ratio of a region in which the liquid crystal film and the spacer are disposed in a region sandwiched by the first glass plate and the second glass plate, the occupancy rate is 91% or greater, and
at least one of the first interlayer and the second interlayer is disposed to partially enter a portion between the spacer and the liquid crystal film.

2. The laminated glass according to claim 1,
wherein a height of the spacer is equal to or higher than a height of the liquid crystal film.

3. The laminated glass according to claim 1,
wherein
a light-shielding part that shields light that reaches the sealing material from the outside is provided along an outer periphery of the laminated glass.

4. The laminated glass according to claim 3,
wherein the light-shielding part is disposed from an end surface of the laminated glass up to a position on an inner side in comparison to the sealing material, and
the light-shielding part is disposed at a position between the liquid crystal film and the first glass plate.

5. The laminated glass according to claim 3,
wherein the light-shielding part is disposed from an end surface of the laminated glass up to a position on an inner side in comparison to the sealing material, and
the light-shielding part is disposed at both a position between the liquid crystal film and the first glass plate, and a position between the liquid crystal film and the second glass plate.

6. The laminated glass according to claim 3,
wherein the light-shielding part is disposed to cover an end surface of the laminated glass, and to sandwich the laminated glass from the end surface up to a position on an inner side in comparison to the sealing material.

7. The laminated glass according to claim 3,
wherein the light-shielding part is disposed to cover an end surface of the laminated glass, and to sandwich the laminated glass from the end surface up to a position on an outer side in comparison to the sealing material, and
the light-shielding part is disposed at both a position between the liquid crystal film and the first glass plate, and a position between the liquid crystal film and the second glass plate.

8. A method for producing laminated glass by using a laminated body in which a liquid crystal film is interposed between a first glass plate and a second glass plate,
the liquid crystal film including a pair of polarization plates, a pair of alignment layers, a pair of base materials, a liquid crystal layer and a sealing material that is disposed to seal the liquid crystal layer and surrounds a periphery of the liquid crystal layer, and
the first glass plate and the second glass plate having an outer shape larger than an outer shape of the liquid crystal film, the method comprising:
a spacer disposing process of disposing a spacer in at least a part of a region which is interposed between the first glass plate and the second glass plate and in which the liquid crystal film is not disposed so as to surround an outer side of the sealing material in a plan view; and
a pressurization process of pressurizing a plate surface of at least one of the first glass plate and the second glass plate in a state in which the spacer is disposed, and wherein:
the spacer surrounds an entirety of an outer periphery of the liquid crystal film;
in a case the spacer is disposed at a distance from the liquid crystal film, and when an occupancy rate is defined as a percentage of an area ratio of a region in which the liquid crystal film and the spacer are disposed in a region sandwiched by the first glass plate and the second glass plate, the occupancy rate is 91% or greater, and
at least one of the first interlayer and the second interlayer is disposed to partially enter a portion between the spacer and the liquid crystal film.

9. The method for producing laminated glass according to claim 8,
wherein a height of the spacer is equal to or higher than a height of the liquid crystal film.

* * * * *